US008677020B2

(12) United States Patent
Levkovitz et al.

(10) Patent No.: US 8,677,020 B2
(45) Date of Patent: Mar. 18, 2014

(54) DEVICE, SYSTEM AND METHOD OF WIRELESS DELIVERY OF TARGETED ADVERTISEMENTS

(75) Inventors: Zohar Levkovitz, Tel-Aviv (IL); Gil Shulman, Tel Aviv (IL)

(73) Assignee: Amobee Inc., Redwood City, CA (US)

( * ) Notice: Subject to any disclaimer, the term of this patent is extended or adjusted under 35 U.S.C. 154(b) by 1325 days.

(21) Appl. No.: 11/332,387

(22) Filed: Jan. 17, 2006

(65) Prior Publication Data
US 2007/0088851 A1 Apr. 19, 2007

Related U.S. Application Data

(63) Continuation-in-part of application No. 11/250,476, filed on Oct. 17, 2005.

(51) Int. Cl.
G06F 15/16 (2006.01)

(52) U.S. Cl.
USPC ........... 709/246; 709/203; 709/238; 455/514; 455/517; 705/12

(58) Field of Classification Search
USPC .............. 709/203, 238; 455/514, 517; 705/14
See application file for complete search history.

(56) References Cited

U.S. PATENT DOCUMENTS

| | | | |
|---|---|---|---|
| 6,622,174 B1 | 9/2003 | Ukita et al. | |
| 6,625,732 B1 | 9/2003 | Weirauch et al. | |
| 6,965,914 B2 | 11/2005 | Dowling | |
| 7,076,244 B2 * | 7/2006 | Lazaridis et al. | 455/414.2 |
| 7,254,614 B2 * | 8/2007 | Mulligan et al. | 709/207 |
| 2002/0004743 A1 | 1/2002 | Kutaragi et al. | |
| 2002/0022453 A1 | 2/2002 | Balog et al. | |
| 2002/0062251 A1 | 5/2002 | Anandan et al. | |
| 2002/0062361 A1 | 5/2002 | Kivipuro et al. | |
| 2002/0062385 A1 | 5/2002 | Dowling | |
| 2002/0077897 A1 * | 6/2002 | Zellner et al. | 705/14 |
| 2002/0087631 A1 * | 7/2002 | Sharma | 709/203 |
| 2002/0164977 A1 | 11/2002 | Link, II et al. | |
| 2003/0003935 A1 * | 1/2003 | Vesikivi et al. | 455/517 |
| 2003/0026231 A1 | 2/2003 | Lazaridis et al. | |
| 2003/0104820 A1 * | 6/2003 | Greene et al. | 455/456 |
| 2003/0120817 A1 | 6/2003 | Ott et al. | |

(Continued)

FOREIGN PATENT DOCUMENTS

WO WO 02/37278 5/2002
WO WO 02/076077 9/2002

OTHER PUBLICATIONS

International Search Report for International Application No. PCT/IL07/00514 mailed Apr. 2, 2008.

(Continued)

Primary Examiner — Thuong Nguyen
(74) Attorney, Agent, or Firm — Pearl Cohen Zedek Latzer Baratz LLP

(57) ABSTRACT

Devices, systems and methods of wireless delivery of targeted advertisements. A system in accordance with an embodiment of the invention includes a modifier to receive a message transmitted by a first wireless communication device and intended for reception by a second wireless communication device, and to selectively add an advertisement to the message prior to its presentation on the second wireless communication device. The message is a Short Message Service (SMS) message, a Multimedia Messaging Service (MMS) message, an Instant Messaging (IM) message, and an Electronic Mail (Email) message.

26 Claims, 6 Drawing Sheets

(56) References Cited

U.S. PATENT DOCUMENTS

| | | |
|---|---|---|
| 2003/0163369 A1 | 8/2003 | Arr |
| 2003/0200283 A1 | 10/2003 | Suryanarayana et al. |
| 2003/0224832 A1 | 12/2003 | King et al. |
| 2004/0073713 A1 | 4/2004 | Pentikainen et al. |
| 2004/0185777 A1* | 9/2004 | Bryson ................. 455/41.1 |
| 2005/0096016 A1 | 5/2005 | Tervo et al. |
| 2005/0114895 A1 | 5/2005 | Ismail et al. |
| 2005/0208930 A1 | 9/2005 | Zmrzli |
| 2005/0227679 A1 | 10/2005 | Papulov |
| 2005/0262428 A1* | 11/2005 | Little et al. ............... 715/501.1 |
| 2006/0041474 A1 | 2/2006 | Westling et al. |
| 2006/0053109 A1 | 3/2006 | Sudanagunta et al. |
| 2006/0100928 A1 | 5/2006 | Walczak et al. |
| 2006/0152622 A1 | 7/2006 | Tan et al. |
| 2006/0195505 A1* | 8/2006 | Jerbi et al. ................. 709/203 |
| 2007/0088801 A1 | 4/2007 | Levkovitz et al. |
| 2007/0088838 A1 | 4/2007 | Levkovitz et al. |
| 2007/0088852 A1 | 4/2007 | Levkovitz |
| 2007/0298842 A1* | 12/2007 | Kamada et al. ............... 455/566 |

OTHER PUBLICATIONS

International Search Report for International Application No. PCT/IL06/01181 mailed Feb. 15, 2008.
International Search Report for International Application No. PCT/IL07/00082 mailed Feb. 15, 2008.
Office Action for U.S. Appl. No. 11/337,553 mailed Mar. 10, 2008.
Israeli Office Action of Application No. 192856 issued on Nov. 28, 2013.

* cited by examiner

DEVICE, SYSTEM AND METHOD OF WIRELESS DELIVERY OF TARGETED ADVERTISEMENTS

PRIOR APPLICATION DATA

This application is a continuation-in-part of, and claims priority and benefit from, U.S. patent application Ser. No. 11/250,476, entitled "Device, System and Method of Wireless Content Delivery", filed on Oct. 17, 2005, which is hereby incorporated by reference in its entirety.

BACKGROUND OF THE INVENTION

In the field of wireless communications, a wireless communication system may allow a wireless communication device to download and use games and applications, to transmit and receive a Short Message Service (SMS) item or a Multimedia Messaging Service (MMS) item, or the like.

Unfortunately, such operations, in which content is downloaded to or uploaded from the wireless device, may consume system resources and bandwidth resources, and may require a user to pay a fee to cover the cost of using such resources.

SUMMARY OF THE INVENTION

Some embodiments of the invention include devices, systems and methods of wireless content delivery.

Some embodiments may provide, for example, contextual and/or non-contextual placement of content, e.g., advertisements or banners, within an application executed by a cellular phone, a mobile phone, or other wireless communication device.

In some embodiments, previously-prepared applications, e.g., utilities or games for mobile phones, may be configured or adapted to include or embed a content client, e.g., using a Software Development Kit (SDK) or a Close Class. The content client may periodically connect to a content server or ad server and request content. The ad server may selectively serve content items to the content client, based on parameters related to the mobile phone, e.g., manufacturer identifier, model identifier, available memory, presentation capabilities, or the like, and/or based on parameters related to a user of the mobile phone, e.g., age, age group, gender, marital status, profession, occupation, geographical location, proximity to geographical places, or the like.

In some embodiments, the ad server or other operatively associated servers may perform ad targeting, for example, to target or tailor an appropriate content item based on such parameters. In one embodiment, the ad server or other operatively associated servers may perform ad targeting based on Customer Relationship Management (CRM) data about the user, based on various information or personal information collected or otherwise obtained about a user, based on information that the user provided (e.g., using a form, a web-site, an opt-in service, or the like), based on a usage analysis of the mobile phone by the user, based on a contextual analysis of messages sent and/or received by the mobile phone, or the like.

In some embodiments, the mobile phones may periodically report to the ad server, or to other operatively associated servers, information related to past presentation of content items by the mobile phone and/or information regarding other actions or operations performed by the user, e.g., since the last reporting and/or since the last request for content items.

In some embodiments, for example, a system may include a server to receive an application-initiated content request from a wireless communication device, and to selectively serve to the wireless communication device a content item based on data included in the application-initiated content request, wherein the application-initiated content request may include data identifying at least a manufacturer of the wireless communication device and a model of the wireless communication device.

In some embodiments, for example, the application-initiated content request may include a data item selected, e.g., taking into account the capabilities of the device, from a group consisting of: a data item representing an available memory of the wireless communication device, a data item representing an audio capability of the wireless communication device, a data item representing a video capability of the wireless communication device, a data item representing a screen size of the wireless communication device, a data item representing a content item type that the wireless communication device is able to present, and a data item representing a location of the wireless communication device.

In some embodiments, for example, the server may selectively serve the content item based on a personal data item representing a property of a user of said wireless communication device. In some embodiments, for example, the personal data item may be selected from a group consisting of: a data item representing an age of the user, a data item representing an age group of the user, a data item representing a gender of the user, a data item representing an occupation of the user, a data item representing a profession of the user, and a data item representing usage pattern associated with the user.

In some embodiments, for example, the server may include a memory unit to store a plurality of content items from which the content item is selected.

In some embodiments, for example, the memory unit may include a volatile memory or a non-volatile memory.

In some embodiments, for example, the server is to periodically copy the content of the volatile memory into a non-volatile memory.

In some embodiments, for example, the plurality of content items may include at least a first version of the content item adapted for presentation using a first type of wireless communication device, and a second version of the content item adapted for presentation using a second type of wireless communication device.

In some embodiments, for example, the server is operatively associated with a communicator able to receive a plurality of substantially concurrent content requests and to store the plurality of content requests in a queue.

In some embodiments, for example, the system may include a first listener port to detect a first incoming content request, and a second listener port to substantially simultaneously detect a second, substantially concurrent, incoming content request.

In some embodiments, for example, the system may include a first reader port to read the first incoming content request, and a second reader port to substantially simultaneously read the second, substantially concurrent, incoming content request.

In some embodiments, for example, the server is able to execute substantially simultaneously a first thread to process the first incoming content request and a second thread to process the second incoming content request.

In some embodiments, for example, the system may include a first writer port to transmit a first content item in response to the first incoming content request, and a second writer port to substantially simultaneously transmit a second content item in response to the second incoming content request.

In some embodiments, for example, the wireless communication device may include: a receiver to receive the content item; and a selector to selectively present the content item if a pre-defined condition is met.

In some embodiments, for example, the server is to serve the content item if a number of previously-served content items is smaller than a pre-defined quota.

In some embodiments, for example, the server may include: a plurality of serving platforms; and a balancer to distribute a quota of servings of the content item among the plurality of serving platforms.

In some embodiments, for example, the server may include a content adapter to receive a first version of the content item and to generate a second, different, version of the content item.

In some embodiments, for example, a method may include receiving an application-initiated content request from a wireless communication device; and selectively serving to the wireless communication device a content item based on data included in the application-initiated content request, wherein the application-initiated content request may include data identifying at least a manufacturer of the wireless communication device and a model of the wireless communication device.

In some embodiments, for example, the application-initiated content request may include a data item selected from a group consisting of: a data item representing an available memory of the wireless communication device, a data item representing an audio capability of the wireless communication device, a data item representing a video capability of the wireless communication device, a data item representing a screen size of the wireless communication device, a data item representing a content item type that the wireless communication device is able to present, and a data item representing a location of the wireless communication device.

In some embodiments, for example, the method may include selectively serving the content item based on a personal data item representing a property of a user of said wireless communication device. In some embodiments, for example, the data item is selected from a group consisting of: a data item representing an age of the user, a data item representing an age group of the user, a data item representing a gender of the user, a data item representing an occupation of the user, a data item representing a profession of the user, and a data item representing usage pattern associated with the user.

In some embodiments, for example, the method may further include storing in a memory unit a plurality of content items; and selecting the content item from the plurality of content items.

In some embodiments, for example, storing in a memory unit may include storing in a volatile memory, and the method may further include periodically copying the content of the volatile memory into a non-volatile memory.

In some embodiments, for example, the plurality of content items may include at least a first version of the content item adapted for presentation using a first type of wireless communication device, and a second version of the content item adapted for presentation using a second type of wireless communication device.

In some embodiments, for example, the method may further include receiving a plurality of substantially concurrent content requests; and storing the plurality of content requests in a queue.

In some embodiments, for example, the method may include substantially simultaneously detecting a first incoming content request and a second, substantially concurrent, incoming content request.

In some embodiments, for example, the method may include substantially simultaneously reading the first incoming content request and the second, substantially concurrent, incoming content request.

In some embodiments, for example, the method may include substantially simultaneously executing a first thread to process the first incoming content request and a second thread to process the second incoming content request.

In some embodiments, for example, the method may include substantially simultaneously transmitting a first content item in response to the first incoming content request and a second content item in response to the second incoming content request.

Some embodiments may include, for example, a machine-readable medium having stored thereon a set of instructions that, if executed by a machine, result in: receiving an application-initiated content request from a wireless communication device; and selectively serving to the wireless communication device a content item based on data included in the application-initiated content request, wherein the application-initiated content request may include data identifying at least a manufacturer of the wireless communication device and a model of the wireless communication device.

In some embodiments, for example, a wireless communication device may include a transmitter to transmit an application-initiated content request; and a receiver to receive a content item selected by a server based on data included in the application-initiated content request, wherein the application-initiated content request may include data identifying at least a manufacturer of the wireless communication device and a model of the wireless communication device.

In some embodiments, for example, system may include a modifier to receive a message transmitted by a first wireless communication device and intended for reception by a second wireless communication device, and to selectively add an advertisement to the message prior to its presentation on the second wireless communication device.

In some embodiments, for example, the message may include a message selected from a group consisting of: a Short Message Service (SMS) message, a Multimedia Messaging Service (MMS) message, an Instant Messaging (IM) message, and an Electronic Mail (Email) message.

In some embodiments, for example, the modifier is to select the advertisement based on a contextual analysis of the message.

In some embodiments, for example, the contextual analysis may include an analysis utilizing a taxonomy tree of classified topics.

In some embodiments, for example, the contextual analysis is to determine to maintain the message unmodified.

In some embodiments, for example, the modifier is to select the advertisement based on a contextual analysis of one or more messages communicated prior to said message.

In some embodiments, for example, the modifier is to select the advertisement based on a manufacturer of the second wireless communication device and a model of the second wireless communication device.

In some embodiments, for example, the modifier is to select the advertisement based on a location of the second wireless communication device.

In some embodiments, for example, the modifier is to select the advertisement based on a personal data item representing a property of a user of the second wireless communication device.

In some embodiments, for example, the personal data item is selected from a group consisting of: a data item representing an age of said user, a data item representing an age group of said user, a data item representing a gender of said user, a data item representing an occupation of said user, a data item representing a profession of said user, and a data item representing usage pattern associated with said user.

In some embodiments, for example, the system may include a proxy server to intercept the message transmitted by the first wireless communication device, and to route the message to a gateway incorporating said modifier.

In some embodiments, for example, the modifier is included in said first wireless communication device, and the modifier is to selectively add the advertisement prior to transmission of the message to the second wireless communication device.

In some embodiments, for example, the modifier is included in said second wireless communication device.

In some embodiments, for example, the modifier is included in a message client application of said second wireless communication device.

In some embodiments, for example, the modifier is to obtain the advertisement from a local cache operatively coupled to the modifier.

In some embodiments, for example, the modifier is included in a device selected from a group consisting of: the first wireless communication device, and the second wireless communication device; and the modifier is to obtain the advertisement from a local cache of said device while said device is offline.

In some embodiments, for example, the modifier is to obtain the advertisement through an online connection with an advertisement server.

In some embodiments, for example, a method may include: receiving a message transmitted by a first wireless communication device and intended for reception by a second wireless communication device; and selectively adding an advertisement to the message prior to its presentation on the second wireless communication device.

In some embodiments, for example, the method may include receiving a message selected from a group consisting of: a Short Message Service (SMS) message, a Multimedia Messaging Service (MMS) message, an Instant Messaging (IM) message, and an Electronic Mail (Email) message.

In some embodiments, for example, the method may include selecting the advertisement based on a contextual analysis of the message.

In some embodiments, for example, the method may include, based on a contextual analysis of the message, determining to maintain the message unmodified.

In some embodiments, for example, the method may include intercepting the message transmitted by the first wireless communication device.

In some embodiments, for example, a wireless communication device may include: a receiver to receive a message transmitted by another wireless communication device and intended for reception by said wireless communication device; and a modifier to selectively add an advertisement to the message prior to its presentation on said wireless communication device.

In some embodiments, for example, the wireless communication device may include a receiver to receive a message selected from a group consisting of: a Short Message Service (SMS) message, a Multimedia Messaging Service (MMS) message, an Instant Messaging (IM) message, and an Electronic Mail (Email) message.

In some embodiments, for example, the modifier is to select the advertisement based on a contextual analysis of the message; to select the advertisement based on a contextual analysis of at least one message communicated prior to said message; and/or to select the advertisement from a local cache when said wireless communication device is offline.

Embodiments of the invention may provide various other benefits or advantages.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
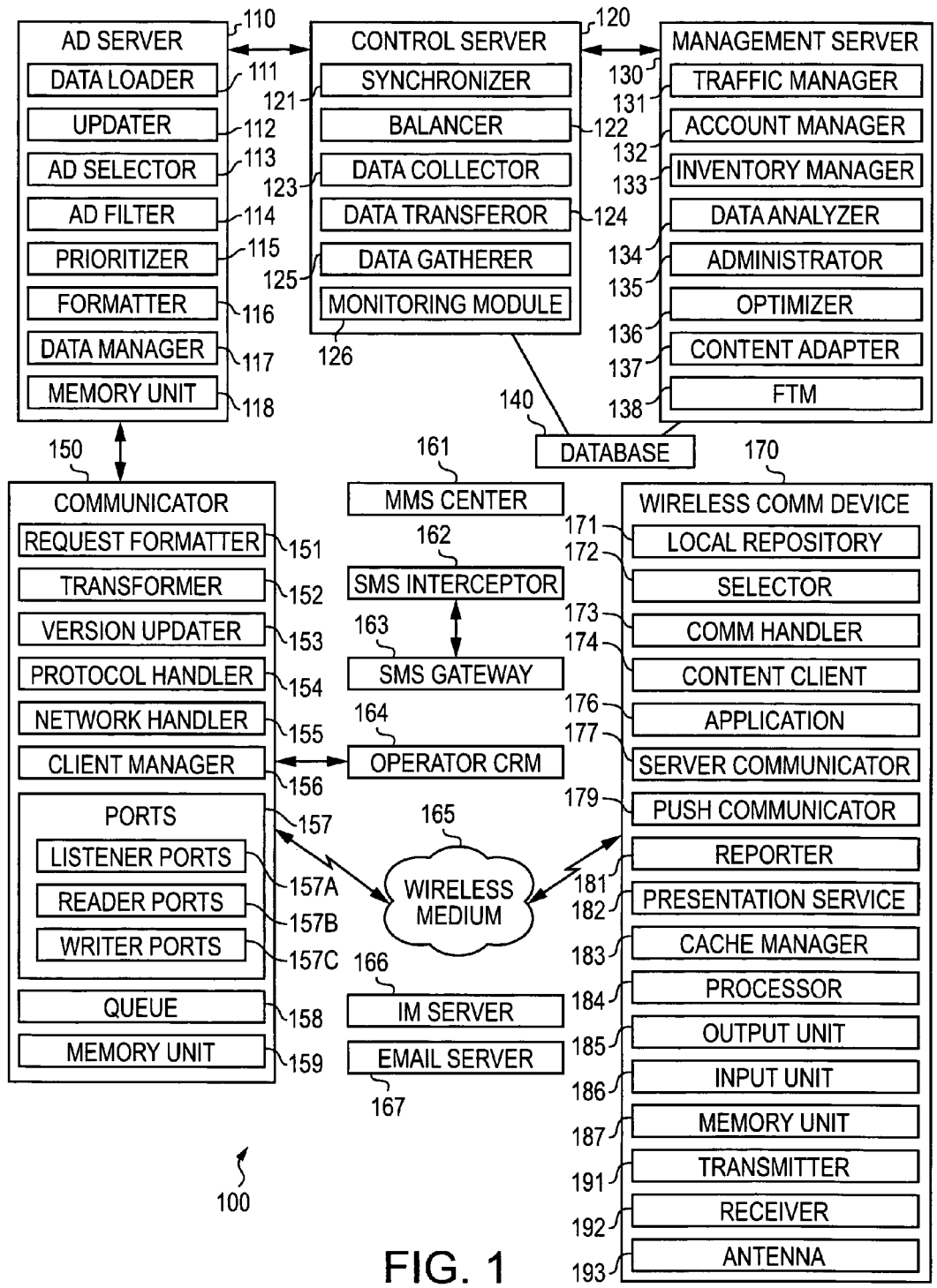
FIG. 1 is a schematic block diagram illustration of a wireless communication system able to deliver content in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

FIG. 1 schematically illustrates a block diagram of a wireless communication system 100 able to deliver content in accordance with an embodiment of the invention. System 100 may include, for example, an ad server 110, a control server 120, a management server 130, a database 140, a communicator 150, and one or more wireless communication devices, e.g., a wireless communication device 170.

In accordance with some embodiments of the invention, device 170 may include an application 176 having a content client 174. The application 176 may be, for example, a game or a software application. The content client 174 may be a module of application 176, a plug-in of application 176, or an external module operatively associated application 176. Content client 174 may be able to send a wireless signal indicating a request ("content request") to receive one or more content items, e.g., textual content, audio content, video content, advertisement, informational items, or the like. The content request may include, for example, data indicating properties of device 170, e.g., handset manufacturer, handset model, screen resolution, screen color depth, audio capabilities, total memory, available memory, types of content items which the device 170 is capable to present, or the like; data indicating properties of the user of device 170, e.g., age, age group, gender, occupation, profession, areas of interest, income, usage habits, usage patterns, usage time, or the like; and/or other suitable information, e.g., data indicating the type of application associated with application 176, data identifying application 176, or the like.

In some embodiments, the content request may be application-initiated, automatically-initiated, computer-initiated, periodically-initiated, user-initiated, non-user-initiated, or the like. For example, in one embodiment, application 176 may periodically initiate and transmit a content request, e.g., without intervention or command from the user of device 170, or in the background and without the knowledge or awareness of the user of device 170. In some embodiments, for example, application 176 may operate or continue to operate substantially seamlessly, and in parallel may automatically initiate and transmit a content request, e.g., periodically or when a pre-defined condition is met.

The content request may be received by communicator 150, which may re-format or tailor the request in accordance with pre-defined rules or formats. In one embodiment, communicator 150 may augment the content request, e.g., by adding information obtained from a Customer Relationship Management (CRM) repository 164. Communicator 150 may place the content request in a queue 158 within a memory unit 159 storing multiple content requests received, e.g., previously or concurrently, from other wireless communication devices in communication with communicator 150.

Ad server 110 may include one or more servers, or a "server farm", which may be operatively connected to communicator 150. Ad server 110 may process content requests stored in the queue 158 of communicator 150, e.g., in accordance with a pre-defined order or algorithm. For example, ad server 150 may obtain a content request from the queue 150, and may search a content items repository 118 within ad server 110 for one or more content items which match the requirements of the content request. In some embodiments, ad server 110 may selectively determine which content items, which may be previously stored in the content items repository 118, match the content request being processed, e.g., using queries, filters, selection rules, capping rules, or other conditions or criteria. In one embodiment, for example, ad server 110 may select one or more content items which may be adequately presented by device 170 based on properties of device 170, e.g., handset model, screen resolution, screen color depth, audio capabilities, total memory, available memory, types of content items which the device 170 is capable to present, or the like.

In some embodiments, ad servers 150 may include multiple servers which may be shared among multiple campaigns or may be dedicated for a specific campaign or type of operation. For example, in one embodiment, a first ad server 150 may serve content items directed for presentation using a first application 176 (e.g., a chess game), whereas a second ad server 150 may serve content items directed for presentation using a second application 176 (e.g., a racing game). In another embodiment, a first ad server 150 may serve content items directed for presentation using a first type of applications 176 (e.g., games), whereas a second ad server 150 may serve content items directed for presentation using a second type of applications 176 (e.g., utility applications). In yet another embodiment, a first ad server 150 may serve content items of a first type (e.g., images in JPG format, images having a first file size, or the like), whereas a second ad server 150 may serve content items of a second type (e.g., images in GIF format, images having a second file size, or the like). In still another embodiment, a first ad server 150 may serve content items for SMS-related applications, a second ad server 150 may serve content items for MMS-related applications, a third ad server 150 may serve content items for IM-related applications, a fourth ad server 150 may serve content items for Email-related applications, and a fifth ad server 150 may serve content items for other types of applications. In some embodiments, a single ad server 150 may serve content items to multiple applications (e.g., SMS-related applications and/or MMS-related applications and/or IM-related applications and/or Email-related applications, or a combination of some of these applications). Other suitable combinations and configurations may be used. In another embodiment, a first ad server 150 may be dedicated to serve content items associated with a first advertiser, whereas a second ad server may be dedicated to serve content items associated with a second advertiser or with a group of multiple advertisers. Other suitable configurations may be used.

Ad server 110 may serve, transfer or transmit one or more selected content items to communicator 150. Optionally, communicator 150 may re-format or tailor the content items to accommodate the properties of device 170, for example, instead of a prior re-formatting by ad server 110 or in addition to such prior re-formatting. Communicator 150 may transmit the content items ("content response") to device 170, which may receive the content items and store them in a local repository 171.

In one embodiment, communicator 150 may further transmit to device 170, e.g., together with the content item(s) or in a separate transmission, one or more presentation rules associated with the transmitted content items. The presentation rules may include, for example, a capping rule to cap the number of times that a certain content item may be presented, e.g., within a certain time period; a capping rule to cap the number of times that a certain type of content items (e.g., animated content items, large-sized content items, audio content items) may be presented within a certain time period; a rule instructing device 170 to present a certain content item at a certain time or within a certain time window; a rule instructing device 170 to present the content items in accordance with a certain order or priority scheme; or other suitable rules or data to control the presentation of the content items.

In some embodiments, the content response may be received by device 170 automatically, e.g., without intervention or command from the user of device 170, or in the background and without the knowledge or awareness of the user of device 170. In some embodiments, for example, application 176 may operate or continue to operate substantially seamlessly, and in parallel may automatically receive a content request, e.g., periodically.

Device 170 may present the content item(s), for example, when device 170 is "online" and operatively connected to a servicing station or base station, and/or when device 170 is "offline" and is not operatively connected to a servicing station or base station. The presentation of the content item(s) may be performed by device 170 in accordance with the presentation rules provided by communicator 150. The presentation may be performed, for example, within application 176, during or together with the execution of application 176, before the execution or application 176, or after the execution of application 176. In some embodiments, the presentation may be performed using application 176, using content client 174, or using a presentation service which may be installed within device 170 and/or application 176 and/or content client 174.

Device 170 may store or otherwise log information related to presentations performed by device 170, e.g., data indicating the content item(s) presented, data the starting time and/or ending time of the presentations, data indicating operations performed by device 170 and/or the user of device 170 during or after the presentation (e.g., pressing a button, dialing, sending a SMS or MMS message, placing a call, or the like). Device 170 may periodically upload the logged data, e.g., to communicator 150, which may aggregate such data from multiple wireless communication devices. In one embodiment, the presentation-related data or the aggregated presentation-related data may be used for financial transactions or billing purposes, for example, to request or collect payment from an advertiser that provided the presented content items, to pay to a provider of the application 176 within which the presentation is performed, or the like.

Content items may be created or received (e.g., from third parties or advertisers) using management server 130. A content adapter 137 of management server 140 may create multiple versions of content item, for example, having various dimensions, various color depth, various sizes in bytes, various file formats (e.g., JPG, GIF, TIF, BMP, AVI, MPG, MOV, TXT, or the like), various codec sets, or differing in other properties. In one embodiment, for example, content items may have multiple versions corresponding to a descriptive property of device 170, e.g., a full-size content item which may fill the entire screen of device 170, a half-screen size content item which may occupy approximately one half of the screen of device 170, a quarter-screen size content item which may include a square-shaped or rectangular content item which may occupy approximately one quarter of the screen of device 170, or the like. The various versions of a content item may be stored in database 140. Management server 140 may further receive, and may store in database 140, data indicating that a content item is ready for serving, e.g., data indicating properties of an advertising campaign that the content item may be associated with.

Management server 130 may include one or more modules or components, for example, a traffic manager 131, an account manager 132, an inventory manager 133, a data analyzer 134, an administrator module 135, an optimizer 136, content adapter 137, and a Financial Transactions Module (FTM) 138.

Traffic manager 131 may receive, for example, data representing definitions of a campaign of serving content items, and may generate campaign-related data. Traffic manager 131 may control and manage one or more campaigns of serving content items, including content items ("creatives") provided by one or more users, e.g., advertisers, advertising agencies, customers, or the like. Traffic manager 131 may monitor behavior and performance of a serving campaign, may generate reports, and may suspend or terminate a campaign, e.g., upon demand, if a pre-defined condition is met, or if an alert is generated within system 100.

Account manager 132 may allow insertion, modification or deletion of the details of one or more users, for example, advertisers, by such users and/or by an administrator of system 100.

Inventory manager 133 may estimate or predict usage of content items inventory, and may be used to categorize inventory content items. For example, a gaming content item may be added to an inventory list, stored in database 140, and categorized according to various criteria, e.g., game type, relevant ad types, or the like. Inventory manager 133 may produce notifications regarding overbooked inventory items, an estimated lack of future ad space, or an estimated lack of current ad space. Inventory manager 133 may be operatively associated with inventory optimizer 136, which may perform optimization operations on inventory items based on pre-defined criteria.

Data analyzer 134 may analyze inventory data and campaign-related data and may produce reports, e.g., statistical reports for advertisers and/or an administrator of system 100, market research reports, data mining reports, On-Line Analytical Processing (OLAP) reports, or the like.

Administrator module 135 may allow an administrator to access, control or operate one or more modules of management server 130.

FTM 138 may process and/or perform financial transactions, for example, based on the operations of ad server 110, communicator 150 and/or device 170. In one embodiment, for example, FTM 138 may request or collect a payment, e.g., from an advertiser associated with a certain content item, for serving(s) of that content item by ad server 110, and/or for presenting that content item by device 170. In another embodiment, for example, FTM 138 may perform a payment, e.g., to a third party which manufactured or provided the application 176, when the application 176 is downloaded and installed into device 170, thereby allowing device 170 to receive content items from system 100. Other suitable financial transactions may be performed.

Control server 120 may include one or more modules or components, for example, a synchronizer 121, a balancer 122, a data collector 123, a data transferor 124, a data gatherer 125, and a monitoring module 126.

Control server 120 may selectively obtain from database 140 content items which are ready for serving in accordance with pre-defined rules, e.g., specific campaign-related rules. Control server 120 may selectively provide or distribute the content items to one or more ad servers 110, optionally together with capping rules and/or other rules controlling the servings of these content items. In one embodiment, control server 120 may distribute a content item for serving among multiple ad servers 110; for example, control server 120 may instruct a first ad server 110 to serve a first version of the content item not more than 400 times within the next 24 hours, and may instruct a second ad server 120 to serve a second version of the content item not more than 300 times within the next 36 hours. Other suitable capping rules or distribution rules may be used.

Control server 120 may, for example, re-format data and/or create files in accordance with a format suitable for a certain ad server 110, or may create or adapt multiple versions of a content item to accommodate multiple ad servers 110 or multiple formats. Control server 120 may monitor and track the distribution of content items among multiple ad servers 110, for example, by detecting that a first ad server 110 is not accessible or not responding and by sending or re-sending the data to a second ad server 110 instead, or by re-sending data to the first ad server 110 after a certain time period. Control server 120 may send setup data and/or configuration data to ad server(s) 110 and/or communicator 150, e.g., periodically and/or upon system update. Control server 120 may upload content items to one or more ad servers 110, and/or may adapt a content item to accommodate a pre-defined format suitable for presentation using device 170.

Control server 120 may further, for example, distribute data of campaigns of content items, and/or distribute updates to such data, to multiple ad servers 110 and/or to "server farms", e.g., using balancer 122, synchronizer 121 and/or data transferor 124. Control server 120 may update capping data, for example, by periodically comparing the number of content items served and a capping limit of requested servings ("impressions") of the content items, e.g., as defined by an advertiser. Control server 120 may trigger or perform maintenance operations, for example, archiving of expired content items. Synchronizer 121 may, for example, perform operations to format or re-format or tailor content items into a format suitable for ad server(s) 110, e.g., a binary format, and may control data transfer to multiple ad servers 110 and verify successful delivery of content items to ad servers 110;

Control server 120 may further collect usage data from ad server 110, e.g., using data collector 123 and/or data gatherer 125. Control server 120 may store the data in database 140, may track data collection, and may detect that a certain ad server 110 is not accessible and collect data upon its recovery. Control server 120 may validate content items integrity, data format correctness, and/or proper data transfer. Control server 120 may monitor the serving status of one or more ad servers 110, e.g., using monitoring module 126.

In one embodiment, a content item may be stored in one format or version, or in a relatively small number of formats or versions, during a testing mode; whereas the content item may be stored in multiple formats or versions, or in a relatively large number of formats or versions, during a "live" phase in which an advertising campaign is operational and content items are served.

Data transferor 124 may distribute content items to ad server(s) 110 periodically and/or in advance, for example, a certain time period before the content items are intended to be served to devices 170, e.g., ahead of a "live" campaign period. This may allow ad server(s) 110 to serve content items at their intended serving time, even if temporarily the ad server(s) 110 may not be able to access the control server 120 at that time or closely prior to that time.

In some embodiments, a first ad server 110 may be assigned to serve a first content item or a first group of content items (e.g., associated with a first advertiser, or having a first type or size), and a second, different ad server 110 may be assigned to serve a second content item or a second group of content items (e.g., associated with a second advertiser, or having a second type or size). For example, control server 120 may determine that certain advertisers may be associated with a first ad server 110, and data transferor 124 may upload to that ad server 110 the content items of the campaigns associated with these advertisers.

In some embodiments, a content item, or a group of content items, may be associated with one or more status identifiers, for example, an "uploaded" identifier indicating that the content item was already uploaded to ad server 110, a "ready" identifier indicating that the content item is not in use yet but is ready for uploading, a "test" identifier indicating that the content item is available for testing purposes only, an "updated" identifier indicating that the content item is updated and optionally requires uploading immediately or at a high priority, a "stopped" or "canceled" identifier indicating that one or more content items may not be served, or the like.

In some embodiments, a content item, or a group of content items, may be held in an upload queue by control server 120. Queue records may be marked as "done" upon uploading of the queued content items, e.g., to track uploaded content items. In one embodiment, if a content item is uploaded and then modified, it may not have an "uploaded" identifier, or a previously-assigned "uploaded" identifier may be reset or modified, e.g., to "ready".

In some embodiments, synchronizer 121 and/or balancer 122 may be used to update capping definitions, for example, among multiple ad servers 110. For example, a first ad server 110 may be non-operational, non-accessible or non-responding, and may not reach its assigned capping or intended quota of servings, whereas a second ad server 110 may be operational and may reach its assigned capping or intended quota of servings; or, for example, the first ad server 110 may have a lower capacity or a lower bandwidth than the second ad server 110. Therefore, synchronizer 121 and/or balancer 122 may periodically recalculate the amount of servings of content items served by each ad server 110, and may re-distribute serving amounts or modify capping definitions or quotas among multiple ad servers 110. For example, periodically, the total cap or remaining quota may be divided by the number of currently active ad servers 110, to result in a partial cap or quota which may be assigned to each of these operational ad servers 110. A similar calculation and re-distribution may be performed based on other suitable parameters, e.g., percentage of time in which each ad server 110 is operational, or the like. In one embodiment, the re-calculation and re-distribution may be performed periodically, and/or when control server 120 detects a substantial between the performance of two or more ad servers 110.

Ad server 110 may selectively provide to communicator 150 one or more content items, e.g., advertisements, in response to a content request from communicator 150. Ad server 110 may select such content items from a content inventory provided to ad server 110 by control server 120, which may be stored in memory unit 118 of ad server 110.

In one embodiment, memory unit 118 may include a non-volatile memory, for example, a long term memory unit, a disk, a hard disk drive, or the like. In another embodiment, memory unit 118 may include a volatile memory, for example, a Random Access Memory (RAM), a Dynamic RAM (DRAM), a Synchronous DRAM (SD-RAM), a Flash memory, a cache memory, a buffer, a stack, a short term memory unit, or the like.

In some embodiments, for example, utilizing volatile memory unit 118, a pre-defined memory "dumping" process may be used. For example, content items ready for serving may be received by ad server 110 from control server 120, may be stored in volatile memory unit 118, and optionally may not be stored in a non-volatile memory of ad server 110. Ad server 110 may serve content items directly from its volatile memory unit 118, and may further store in memory unit 118 a log tracking the activity or servings done by ad server 110. Periodically, for example, at pre-defined time intervals (e.g., every 60 seconds, every 5 minutes, every hour, etc.) or upon serving a certain number of servings of content items (e.g., every 100 impressions, every 500 impressions, etc.), ad server 110 may "dump" or copy the activity log data into a non-volatile memory unit, e.g., included in ad server 110 or database 140. This may allow ad server 110, for example, to rapidly serve content items from its rapidly-available volatile memory unit 118, instead of from a slower non-volatile memory (e.g., database 140 or other database); and the periodical "dumping" process of activity logs may limit the data loss in case of a power outage which may erase the volatile memory unit 118.

In one embodiment, ad server 110 may provide to communicator 150 one or more content items; in another embodiment, ad server 110 may provide to communicator 150 pointers or references to one or more content items, or a list of content items, which may already be stored in volatile and/or non-volatile memory of communicator 150, e.g., in memory unit 159.

Ad server 110 may include one or more modules or components, for example, a data loader 111, an updater 112, an ad selector 113, an ad filter 114, a prioritizer 115, and a formatter 116.

Data loader 111 may obtain one or more parameters to allow ad server 110 to process the content request from communicator 150. Such parameters may include, for example, parameters representing properties of various content items, e.g., a content item identifier, a group identifier (e.g., identifying a group to which the content item belongs), an update time, priority data, a time period during which the content item may be served, a presentation template associated with the content item, an alternate text associated with the content item, a broadcast mode associated with the content item (e.g., "live broadcast" mode, "test" mode, "stop" mode, or the like), a cost or a price associated with a serving of the content item, capping or quota data, attribute data, data representing a target user or a group of target users to which the content item is intended to be presented (e.g., defined by age, by age range, by location, by gender, by occupation, by profession, or the like), or other parameters. In one embodiment, for example, data loader 111 may have a relatively fast access to data, and/or a read-only authorization.

In one embodiment, data loader 111 may optionally be operatively associated with a data manager 117 which may be utilized for loading of new data. For example, data loader 111 may include a reference to a current version of data manager 117, and to a newer version of data manager 117 which may be available; upon completion of a data loading process, data loader may switch or modify the reference to point to the newer or latest available version of data manager 117, which may be utilized in subsequent loadings.

Ad selector 113 may receive a first list of content items, and may selectively produce a second list of one or more content items to be served. Ad selector 113 may process or parse the content request received from communicator 150 to obtain information about device 170 and/or the user of device 170 from which the content request originates, and may correlate between such information and matching content items attributes. For example, ad selector 113 may determine that the content request originates from device 170 associated with user who is a 22 year old male student who lives in London and is interested in sports, and may select content items intended to be presented to such user, e.g., an advertisement of a sporting event in London.

Additionally or alternatively, ad selector 113 may process or parse the content request received from communicator 150 to obtain information about the device 170 from which the content request originated, and may correlate between such device information and content items attributes accommodating such information. For example, ad selector 113 may determine that the content request originates from device 170 able to present JPG images having resolution of 200 by 150 pixels and 8-bit color depth, and may select content items accommodating such attributes.

In some embodiments, ad selector 113 may select content items based on multiple attributes included in the content request, for example, multiple device 170 attributes and/or multiple user's attributes. In one embodiment, ad selector 113 may cross between multiple lists of candidate content items, to select content items accommodating multiple properties of device 170 and/or the user of device 170.

Ad filter 114 may modify a list of content items generated by ad selector 113, for example, to filter-out and remove content items in accordance with pre-defined criteria or constraints, e.g., capping criteria or quota criteria limiting the number of presentations of a certain content item, campaign-related constraints or quotas, or the like. In one embodiment, ad filter 114 may check original limitations which may be included in relevant campaign-related data or definitions, or other suitable rules or data. For example, a campaign-related definition may require that a certain content item not be presented to the same user more than once, or more than a certain number of times per time period, and ad filter 114 may modify the list of content items according to such requirements.

Prioritizer 115 may calculate or otherwise determine or set a priority value associated with content items, for example, based on one or more parameters, e.g., a priority requirement included in the campaign data or campaign-related definitions, a price or profit associated with presenting the content item, a fulfillment factor, a value indicating the probability that the content item matches its target audience, a value indicating the relative size (e.g., dimensions or bytes), a content item type identifier, or the like. For example, in one embodiment, prioritizer 115 may determine a priority value of "7" for a first content item, which may be associated with a price of 17 cents per serving and with a campaign which is expected to terminate within 8 hours, and may determine a priority value of "2" for a second content item, which may be associated with a price of 12 cents per serving and with a campaign which is expected to terminate within 6 days. In another embodiment, for example, prioritizer 115 may determine a priority value of "8" for a first content item associated with a "sporting events" type, and may determine a priority value of "3" for a second content item associated with a "restaurants" type. In yet another embodiment, for example, prioritizer 115 may determine a priority value of "6" for a first content item having a half-screen size or having a 35 Kilobytes data size, and may determine a priority value of "4" for a second content item having a quarter-screen size or having a 24 Kilobytes data size. Other suitable data or rules may be used to determine absolute or relative priorities of content items.

Formatter 116 may optionally format or re-format or tailor the data produced by ad server 110 before the data is transferred to communicator 150, for example, to match a pre-defined data format or data transfer protocol used by communicator 150.

Communicator 150 may receive a content request from device 170 through a wireless medium 165, may transfer a formatted content request to ad server 110, may receive from ad server 110 one or more content items, and may transmit or transfer the content item(s) to device 170 through wireless medium 165. Communicator 150 may include one or more modules or components, for example, a request formatter 151, a transformer 152, a version updater 153, a protocol handler 154, a network handler 155, a client manager 156, and one or more ports 157.

Network handler 155 may control network communications between communicator 150 and device 170. Network handler 155 may include, for example, a listener module able to detect and receive a wireless signal indicating a content request of device 170, and may thereby trigger the operation of other components of communicator 150 to process the content request and to respond to the content request. Network handler 155 may communicate in parallel with multiple devices 170, for example, using multiple ports 157 and/or multiple wireless communication standards or protocols, and may optionally assign priority values to concurrent communications or a queue 158 for handling multiple received content requests.

For example, communicator 150 may receive a content request from device 170, and network handler 158 may place the content request, or data of the content request, in a queue 158. When the content request it reaches its turn for processing, network handler 155 may transfer to protocol handler 154 the data included in the content request. Upon completion of preparation of the response to the content request, network handler 155 may transmit the content response to device 170.

In some embodiments, multiple ports 157 may be included in communicator 150, to allow parallel or substantially simultaneous handling of multiple content requests. In one embodiment, for example, a first group of ports (e.g., listener ports 157A) may detect wireless signals carrying content requests incoming from device(s) 170; a second group of ports (e.g., reader ports 157B) may read the detected content requests; and a third group of ports (e.g., writer ports 157C) may transmit content responses to device(s) 170 upon completion of preparation of content responses.

In one embodiment, content requests read by reader ports 157B, may be stored in a request queue, and may be processed using one or more processing threads, e.g., in parallel or substantially simultaneously. The resulting content responses may be placed in a responses queue for transmission by writer ports 157C. This may allow, for example, utilizing multiple sockets (e.g., TCP/IP sockets or other sockets) or ports 157 to perform listening operations, receiving operations, and transmission operations, for example, in parallel or substantially simultaneously.

In one embodiment, memory unit 159 may include a non-volatile memory, for example, a long term memory unit, a disk, a hard disk drive, or the like. In another embodiment, memory unit 159 may include a volatile memory, for example, a Random Access Memory (RAM), a Dynamic RAM (DRAM), a Synchronous DRAM (SD-RAM), a Flash memory, a cache memory, a buffer, a stack, a short term memory unit, or the like.

In some embodiments, for example, utilizing volatile memory unit 159, a pre-defined memory "dumping" process may be used. For example, content items ready for serving may be received by communicator 150 from ad server 110, may be stored in volatile memory unit 159, and optionally may not be stored in a non-volatile memory of communicator 150. Communicator 150 may optionally re-format or re-package content items directly in volatile memory unit 159, and may transmit content items directly from its volatile memory unit 118 to device(s) 170. Communicator 150 may further store in memory unit 159 a log tracking the activity or transmission done by communicator 150. Periodically, for example, at pre-defined time intervals (e.g., every 60 seconds, every 5 minutes, every hour, etc.) or upon serving a certain number of servings of content items (e.g., every 100 impressions, every 500 impressions, etc.), communicator 150 may "dump" or copy the activity log data into a non-volatile memory unit, e.g., included in communicator 150 or database 140. This may allow communicator 150, for example, to rapidly transmit content items from its rapidly-available volatile memory unit 159, instead of from a slower non-volatile memory (e.g., database 140 or other database); and the periodical "dumping process of activity logs may limit the data loss in case of a power outage which may erase the volatile memory unit 159.

Protocol handler 154 may receive content request data, for example, information about device 170, information about the functional capabilities of device 170, a handset identifier, device attributes (e.g., Operating System (OS), memory size, application type, etc.), the content request time, last connection time, desired request period (e.g., immediately, once within the next two hours, etc.), and other suitable parameters. Protocol handler 154 may optionally re-format or tailor the content request data using the request reformatter 151 into a format suitable for processing by ad server 110, for example, having data arranged in accordance with pre-defined fields, records or parameters. Protocol handler 154 may optionally augment the data received in the content request, e.g., by adding Customer Relationship Management (CRM) information obtained from an operator CRM repository 164, by adding relevant in-memory data (e.g., handset data, application data, etc.), by adding localization data or regional data derived from IP address mapping, or the like.

In one embodiment, communicator 150 may insert into a content request one or more rules or constraints which may be applied by ad server 110 for content item selection or filtering. In one embodiment, for example, based on the available memory and/or the total memory of device 170, communicator 150 may add to the content request a requirement to select only a certain number of content items (e.g., no more than five), to select a group of content items having a certain cumulative data size (e.g., no more than 70 Kilobytes), to select a group of content items having a certain average file size (e.g., no more than 31 Kilobytes), or the like.

Upon receiving the content response from ad server 110, protocol handler 154 may selectively re-format or tailor the content response (e.g., utilizing transformer 152) to accommodate attributes or requirements of device 170, and may transfer the content response to network handler 155 for transmission to device 170. Optionally, version updater 153 may be used to remotely update or upgrade the version of a component of device 170, e.g., of context client 174 of device 170, for example, periodically or when a new version is available.

Device 170 may include or may be, for example, a wireless communication device, a wireless communication station, a Personal Digital Assistant (PDA) device, a Wireless LAN (WLAN) device, devices and/or networks operating in accordance with existing IEEE 802.11, 802.11a, 802.11b, 802.11e, 802.11g, 802.11h, 802.11i, 802.11n, 802.16 standards and/or future versions of the above standards, a Bluetooth® device, a ZigBee device, one-way and/or two-way radio communication systems, cellular radio-telephone communication systems, a cellular phone, a wireless phone, a mobile phone, a Personal Communication Systems (PCS) device, a PDA device which incorporates a wireless communication device, a PDA device which incorporates a mobile phone, a cordless phone, a portable phone, a Digital Enhanced Cordless Telecommunications (DECT) phone or device, an Instant Messaging (IM) terminal or device, or other suitable devices.

Device 170 may include one or more modules or components, for example, a local repository 171, a selector 172, a communication handler 173, content client 174, application 176, a server communicator 177, a push communicator 179, a reporter 181, a presentation service 182, a cache manager 183, a processor 184, an output unit 185, an input unit 186, a memory unit 187, a transmitter 191, a receiver 192, and an antenna 193.

Processor 184 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 184 may, for example, process incoming and/or outgoing wireless communication signals, and may execute instructions to perform other operations of device 170 or its components.

Input unit 186 may include, for example, a keypad, a keyboard, a joystick, a trackball, a mouse, a touch-pad, a touch-screen, a microphone, or other suitable pointing device or input device. Output unit 185 may include, for example, a display unit, a monitor, one or more speakers, or other suitable output devices.

Memory unit 187 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, a disk, a hard disk drive, a miniature disk or hard disk, or other suitable removable or non-removable storage units or memory units.

Transmitter 191 may include, for example, a wireless Radio Frequency (RF) transmitter able to transmit RF signals, e.g., through antenna 193. Receiver 192 may include a wireless RF receiver able to receive RF signals, e.g., through antenna 122.

In some embodiments, the functionality of transmitter 191 and receiver 192 may be implemented in the form of a transceiver, a transmitter-receiver, or one or more units able to perform separate or integrated functions of transmitting and/or receiving wireless communication signals, blocks, frames, transmission streams, packets, messages and/or data.

Antenna 193 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In accordance with some embodiments of the invention, device 170 may include application 176 having a content client 174. The application 176 may be, for example, a game or a software application. The content client 174 may be a module of application 176, a plug-in of application 176, or an external module operatively associated application 176. Content client 174 may be able to send a wireless signal indicating a request ("content request") to receive one or more content items, e.g., textual content, audio content, video content, advertisement, informational items, or the like. The content request may be transmitted to communicator 150, for example, using communication handler 173. In one embodiment, transmission of the content request may be triggered by a user command or a user command, e.g., a signal entered by a user utilizing the input unit 186 and indicating that the user requests one or more content items.

Device 170 may receive from communicator 150 one or more content items ("content response"), e.g., in response to the content request. The content response may be received from communicator 150, for example, using communication handler 173.

The received content items may be stored in local repository 171, e.g., implemented using memory unit 187. The local repository 171 may be managed or controlled by cache manager 183. One or more content items stored in local repository 171 may be selectively presented, for example, in accordance with certain presentation rules, using presentation service 182 and output unit 185.

Selector 172 may select from local repository 171 one or more content items for presentation, e.g., content items matching one or more rules, conditions or criteria related to the content items or to properties associated with their presentation. Presentation rules may be stored or pre-stored in device 170, e.g., in memory unit 187 or as part of content client 174 or application 176 or presentation service 182. In one embodiment, data indicating presentation rules may be received from communicator 170, e.g., close to or together with receiving a content response.

For example, selector 172 may use a first presentation rule requiring that a certain content item, e.g., an advertisement for a certain restaurant, be presented within a pre-defined time period, for example, between 11:30 a.m. to 1:45 p.m., or the like. A second presentation rule may require, for example, that no less than two content items of a certain advertiser, and/or no more than four content items of that advertiser, be presented within a pre-defined time period, e.g., within 5 consecutive hours. A third presentation rule may require, for example, that a first type of content item, e.g., an animated banner having a size of 200 by 150 pixels, be followed by a second type of content item, e.g., a textual or non-animated content item having a size of 60 by 40 pixels. A fourth presentation rule may require, for example, that a certain content item be presented only when a pre-defined period of inactivity elapses, e.g., a period in which the user of device 170 does not perform any operation, or a period in which no content items are presented. A fifth presentation rule may require, for example, that a certain content item, e.g., an advertisement for a certain shop, be presented when device 170 is geographically located within a pre-defined distance (e.g., 300 meters) of the address of that shop.

Other suitable rules and/or combination of rules may be used by selector 172. In applying such rules, selector 172 may utilize information about device 170, information about the user of device 170, and/or other information, e.g., the current time, the current date, available power left, history of prior presentations, history or patterns of usage of device 170, or the like.

Together with or upon presentation of a content item, device 170 may register or log, for example, in memory unit 187, properties related to that presentation, e.g., an identifier of application 176, a location identifier, a presentation starting time, a presentation ending time, the total presentation time, a user's response to the presentation (e.g., user viewed the presentation, user aborted or interrupted or paused the presentation, user pressed a button, user initiated a call or sent a SMS item, user interacted with the presented content item, or the like), and other data. Presentation-related data may be reported by reporter 181 to communicator 150, e.g., periodically, upon demand, together with a subsequent content request, when a pre-defined condition is met, upon presenting a certain number of content items, or the like. In one embodiment, reporter 181 may be triggered or activated by content client 174, presentation service 182, server communicator 177, or other components of device 170.

In some embodiments, for example, a presentation report or presentation-related data may be transmitted by device 170 substantially together with a subsequent content request; for example, a second content request may include a presentation report related to content items presented since a previous report was transmitted, since a previous content request was transmitted, or the like. This may, for example, allow utilizing a single communication session to transmit both a content request and a presentation report. This may, for example, obviate the need to open a first communication session to transmit the content request and a second communication session to transmit the presentation report, or reduce the number of communication transactions required.

Communicator 150 may, for example, transfer the presentation-related data to control server 120, which may store the presentation-related data in database 140 and/or may perform other operations, e.g., calculate an outgoing amount payment or an incoming amount payment associated with the reported presentations.

Cache manager 183 may, for example, perform maintenance operations on local repository 171 and/or memory unit 187. For example, cache manager 183 may delete an expired content item, e.g., a content item that was presented for the maximum number of times allowed and reached its quota or capping, or a content item that expires at a certain date and time. Cache manager may otherwise manage or compact the local repository 171, and may perform management operations with regard to memory unit 187, e.g., deleting presentation-related data regarding previously-presented content items that were already reported by reporter 181. Cache manager 183 may otherwise control the local repository 171, e.g., by replacing a previously-stored content item with a new, updated or replacement content item, or the like.

A content request created by content client 174 may include data representing one or more properties of device 170 and/or one or more properties of the user of device 170, for example, a version identifier of content client 174, an identifier of application 176, an identifier of device 170 (e.g., manufacturer, model, or the like), local time, installation time, last connection time, Operating System (OS) type and version, total memory size of device 170, free or available memory of device 170, free or available memory in local repository 171, screen dimensions (e.g., height and width, by pixels), color depth (e.g., as a number of bits available to represent color information), user information, user name, cache content (e.g., list of previous-stored content items within local repository 171), previous presentations data, or the like.

In some embodiments, content client 174 may periodically establish a connection with ad sever 110, e.g., directly or through communicator 150, to upload data about presented content items, to refresh or update content items stored in local repository 171, to update or upgrade the installed version of content client 174, to upload technical information about device 170 and/or personal information about a user of device 170 to allow improved targeting of content items, or the like.

In some embodiments, device 170 may communicate with communicator 150 and/or ad server 110 using server communicator 177 and/or push communicator 179. For example, in one embodiment, server communicator 177 may utilize HyperText Transfer Protocol (HTTP) or a HTTP library to communicate with communicator 150 and/or ad server 110. In another embodiment, server communicator 177 may open a TCP/IP socket with communicator 150 and/or ad server 110, initialize a connection, resolve the IP address of a Uniform Resource Locator (URL) of communicator 150 and/or ad server 110, send a HTTP request and wait for response; these operations may optionally be performed in a separate background thread.

In some embodiments, an initial URL that server communicator 177 may attempt to access may be pre-defined or pre-stored (e.g., "hard-coded") within content client 174. For example, the initial URL may point to a dedicated online server or domain, e.g., "http://www.ContentItemsAdServer.com", or to sub-domain or network component, e.g., "http://ContentItems.NetworkProvider.com". Other suitable methods may be used by device 170 to initiate communications with communicator 150 and/or ad server 110.

In some embodiments, push communicator 179 may be able to receive a SMS push item, e.g., a SMS item addressed to application 176. In response, push communicator 179 may trigger server communicator 177 to communicate with communicator 150 and/or ad server 110. In one embodiment, push communicator 179 may be directed at, or may be operatively associated with, a SMS booster engine which may optionally be included in system 100 or device 170. In such cases, device 170 may detect and avoid a possible conflict between the operation of push communicator 179 and the operation application 176. In some embodiments, push communicator 179 may optionally communicate with communicator 150, e.g., by sending to communicator 150 a request to receive data, thereby bringing communicator 150 out of a "sleep" mode or a stand-by mode.

System 100 may optionally include other suitable components, for example, an MMS Center (MMSC) 161, an SMS interceptor 162, an SMS gateway 163, an Instant Messaging (IM) server 166, an Email server 167, and/or other servers or components (e.g., routers, switches, gateways, proxies, or the like) which may be operatively associated with communicator 150 and/or ad server 110, and may be used to send and/or receive SMS items and/or MMS items and/or IM items and/or Email items having embedded therein a content item served by ad server 110. For example, in one embodiment, a first wireless communication device 170 may send a SMS or MMS or IM or Email message intended to be received by a second wireless communication device 170; system 100 may intercept the message, and may modify the message, e.g., by adding, inserting, augmenting, appending or embedding into the message a content item stored in ad server 110; and the modified SMS or MMS or IM or Email message may be transmitted to the second wireless communication device 170. In one embodiment, for example, the appended content item may be an selected advertisement which may be added to a user-created SMS or MMS or IM or Email, for example, thereby reducing the cost or price that the sending user and/or the receiving user are required to pay to their service provider(s) in order to send or receive the SMS or MMS or IM or Email message.

In some embodiments, optionally, a content item may be selectively inserted into, or appended to, a SMS or MMS or IM or Email message or other message (e.g., textual message, audio clip, video clip, image, or the like) sent by a first user to a second user. The content item may be selected, for example, based on properties of the sending user and/or based on properties of the receiving party. Additionally or alternatively, in one embodiment, the content item may be selected based on an analysis (e.g., textual analysis, keyword analysis, image recognition analysis, sound recognition analysis, or the like) of the content item; for example, if the sending user sends a textual SMS item containing the word "chocolate" or "love", then a content item having an advertisement for a chocolate product or a flowers delivery service may be selectively added to the SMS item. Other suitable criteria may be used to selectively serve content items.

In some embodiments, device 170 may present to its user one or more selectable options allowing the user to determine whether or not content client 174 will be activated, or whether or not to receive content in accordance with embodiments of the invention. In one embodiment, device 170 may present to its user, for example, a first option to download a first tennis gaming application having no content items, e.g., in exchange for a first amount of payment; and a second option to download a second tennis gaming application (e.g., similar or substantially identical to the first tennis gaming application) and having the capability to receive and present content items, e.g., in exchange for a second (e.g., reduced) amount of payment, or in exchange for substantially no payment. This may allow, for example, deliver of content (e.g., games and other application) to device(s) 170 for a reduced payment or no payment, as the delivered content may be "sponsored" by the advertisers associated with the presented content items.

Management server 130, control server 120, ad server 110, communicator 150, and/or other components of system 100, may be implemented, for example, using one or more computing platforms or computing devices, e.g., one or more computers or servers including a processor, a memory unit, a storage unit, an input unit, an output unit, a transmitter, a receiver, an antenna, a power source, an Operating System, software applications, and/or other suitable software components and/or hardware components.

Device 170 may communicate with communicator 150 and/or ad sever 110 using wireless medium 165, for example, in accordance with one or more standards or protocols, e.g., Transmission Control Protocol (TCP), Internet Protocol (IP), TCP/IP, Session Initiation Protocol (SIP), Signaling System 7 (SS7), Push protocol, SMS protocol, MMS protocol, IM protocol, Code-Division Multiple Access (CDMA), Wideband CDMA (W-CDMA), Time-Division Multiple Access (TDMA), Post Office Protocol 3 (POP3), Internet Message Access Protocol (IMAP), Simple Mail Transfer Protocol (SMTP), User Datagram Protocol (UDP), High-Speed Circuit-Switched Data (HSCSD), Wireless Village Protocol, XMPP Protocol, PAM/Parlay Protocol, SMPP Protocol, UCP Protocol, CIMD2 Protocol, CAMEL Protocol, SIGTRAN Protocol, or the like.

In some embodiments, optionally, one or more components of system 100 may remotely, directly or indirectly trigger device 170 to transmit a content request. For example, in one embodiment, device 170 may be remotely triggered using a "ping" or a ping-like message or packet, a "wake up" message or packet, or the like. In some embodiments, for example, communicator 150, SMS gateway 163, or other component of system 100 may send to device 170 a data item or a message, e.g., having a link or a shortcut which may trigger a content request by device 170. In some embodiments, device 170 may transmit a content request in response to an incoming signal or message, a background incoming signal or message, a user-transparent incoming signal or message, a remote signal or message, or the like.

In some embodiments, optionally, local repository 172 may be shared by multiple applications 176 within device 170. For example, a first application 176 may include a first game, and a second application 176 may include a second game. Device 170 may include the first and second applications 176, having embedded therein first and second content clients 174, respectively. Local repository 172 may optionally be shared by the first and second applications 170 and/or by the first and second content clients 174 of device 170. For example, the first application 176 may be executed and may transmit a content request; in response, multiple content items may be received by receiver 192 and may be stored in local repository 171; one or more content items may be presented by the first application 176. Then, the second application 176 may be executed, and may utilize, e.g., may present, one or more content items which may already be stored in local repository 176. In another embodiment, multiple separate caches or multiple separate local repositories 171 may be used by multiple applications 176 of device 170. In some embodiments, optionally, the second application 176 may report to communicator 150 about presentation performed by the second application and/or the first application, or vice versa. Other suitable configurations may be used.

In some embodiments, optionally, a "cookie" or a cookie-like mechanism may be used by system 100, for example, to identify device 170, to store in device 170 data which may be unique to device 170, to store in device 170 data related to prior communications between device 170 and other components of system 100, to store in device 170 personal information about a user of device 170, or the like. The cookie may be stored, for example, in memory unit 187, and may be periodically read or updated.

Figure 2:
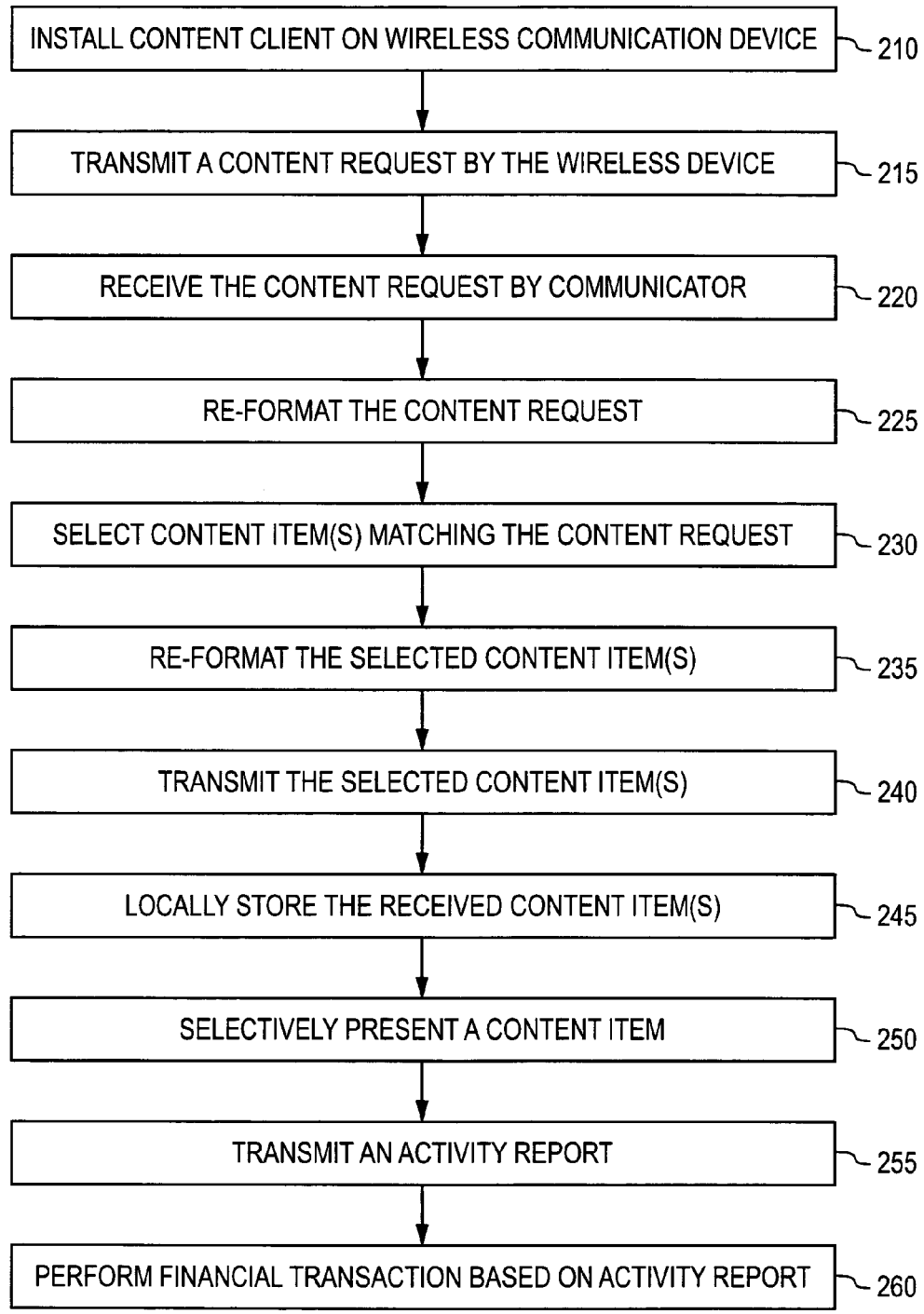
FIG. 2 is a schematic flow-chart of a method of content deliver in accordance with an embodiment of the invention.

FIG. 2 is a schematic flow-chart of a method of wireless content delivery in accordance with an embodiment of the invention. Operations of the method may be implemented, for example, by system 100 of FIG. 1, by ad server 110 of FIG. 1, by communicator 150 of FIG. 1, by device 170 of FIG. 1, by control server 120 of FIG. 1, and/or by other suitable devices and/or systems.

As indicated at box 210, the method may optionally include, for example, installing content client 174 on device 170, e.g., as a stand-alone module or as an embedded part, plug-in or component of application 176. The installing operation may optionally include, for example, downloading the content client 174 from an online source.

As indicated at box 215, the method may optionally include, for example, transmitting a content request from device 170 to communicator 150. This may include, for example, creating a content request having data representing, for example, properties of device 170, properties of the user of device 170, properties of prior usage of device 170, or the like.

As indicated at box 220, the method may optionally include, for example, receiving the content request by communicator 150. This may include, for example, storing the content request in volatile memory 159 of communicator 150. Optionally, multiple content requests may be stored and/or processed using one or more queues.

As indicated at box 225, the method may optionally include, for example, re-formatting the content request by communicator 150, e.g., to accommodate a pre-define format. This may further include, for example, augmenting the content request with additional data, e.g., CRM data related to the user of device 170.

As indicated at box 230, the method may optionally include, for example, selecting one or more content items matching the content request, e.g., by ad server 110. In one embodiment, this may include selecting from a volatile repository of content items within ad server 110. The selection may include, for example, filtering-in or filtering-out content items based on pre-defined rules or criteria, e.g., capping or quota rules, campaign-related definitions, or the like.

As indicated at box 235, the method may optionally include, for example, re-formatting or re-packaging the selected content item(s), e.g., to accommodate or to better accommodate capabilities (e.g., screen size capabilities, audio capabilities, available memory, or the like) of device 170.

As indicated at box 240, the method may optionally include, for example, transmitting the selected content item(s) to device 170.

As indicated at box 245, the method may optionally include, for example, storing the received content item(s) in local repository 171 of device 170.

As indicated at box 250, the method may optionally include, for example, selectively presenting a content item by device 170, e.g., based on one or more criteria or conditions.

As indicated at box 255, the method may optionally include, for example, transmitting by device 170 to communicator 150 an activity report indicating properties of, or data related to, presentations presented by device 170.

As indicated at box 260, the method may optionally include, for example, performing financial transaction, e.g., payments and/or collections, based on the received activity report of presented presentations.

Other suitable operations or sets of operations may be used in accordance with embodiments of the invention.

Some embodiments of the invention may be used, for example, in conjunction with MMS and/or SMS and/or IM and/or Email items, messages, systems and/or networks, e.g., as described herein with reference to FIGS. 3-7. Some embodiments, for example, may allow contextual or targeted advertising, e.g., inside or in conjunction with SMS/MMS/IM/Email messages. For example, a user of a mobile communication device or station which receives a graphical or textual SMS/MMS/IM/Email message, may be selectively presented with an advertisement, which may be suited or tailored based on the content of the incoming SMS/MMS/IM/Email message. The tailoring or targeting of the advertisement may be, for example, sender-oriented and/or recipient-oriented.

Figure 3:
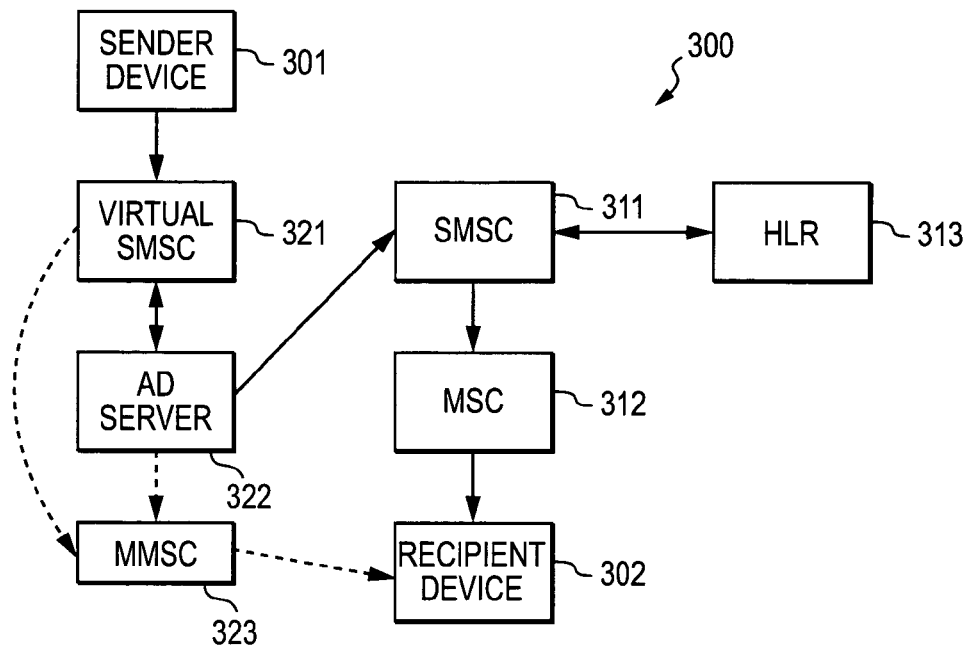
FIG. 3 is a schematic block diagram illustration of a mobile-originated single-network wireless communication system able to deliver content in accordance with an embodiment of the invention.

FIG. 3 schematically illustrates a block diagram of mobile-originated single-network wireless system 300 able to deliver content in accordance with an embodiment of the invention. System 300 may include one or more wireless communication devices or stations, for example, a first wireless communication device which may be referred to as a sender device 301, and a second wireless communication device which may be referred to as a recipient device 302. Optionally, a user of sender device 301 and a user of recipient device 302 may be subscribers of a single wireless communication network of system 300, e.g., a network operated by a single wireless communication operator.

The user of sender device 301 may create, e.g., using sender device 301, a graphical and/or textual SMS message ("SMS message"), intended to be sent from sender device 301 to recipient device 302. Instead of transmitting the SMS message directly from sender device 301 to a Short Message Service Center (SMSC) 311 of system 300, the SMS message may be transmitted from sender device 301 to a virtual SMSC 321 which may be operatively connected to an ad server 322. For example, sender device 301 may be pre-configured or adapted to transmit SMS messages to the virtual SMSC 321, e.g., instead of to the SMSC 311.

The virtual SMSC 321 and/or the ad server 322 may analyze the SMS message, e.g., to selectively determine whether one or more additional content items, e.g., one or more advertisements, may be added to, inserted to, concatenated to, appended to and/or embedded within the SMS message. The determination may be based on, for example, one or more properties of the user of sender device 301, one or more properties of sender device 301, one or more properties of the user of recipient device 302, one or more properties of recipient device 302, and/or other data, e.g., current time, current date, advertisement quotas, demographic data, the original size of the SMS message, a maximum size limit for a modified SMS message, the space available within the SMS message for inclusion of advertisement(s). These parameters may be further used, for example, to selectively choose one or more advertisements, which may be personally tailored to the user of sender device 301 and/or to the user of recipient device 302.

Based on the analysis, the virtual SMSC 321 and/or the ad server 322 may selectively modify the SMS message, e.g., by adding to it or inserting into it one or more advertisements which may be stored in ad server 322; and may optionally convert the SMS message to another type of message, e.g., a MMS message. The modified message may be transmitted, by the virtual SMSC 321 or the ad server 322, to the SMSC 311 of system 300. The SMSC 311 may utilize a Home Location Register (HLR) 313 to determine (e.g., using interrogation) whether recipient device 302 is active, and/or to determine the roaming location of recipient device 302; and may deliver the modified SMS message to recipient device 302, e.g., optionally utilizing a Mobile Switching Center (MSC) 312.

In some embodiments, optionally, ad server 322 may selectively modify the SMS message; may optionally convert the SMS message to another type of message, e.g., a MMS message; and may add to the converted MMS message one or more advertisements stored in ad server 322. The MMS message may be transmitted, by the virtual SMSC 321 or the ad server 322, to a MMS Center (MMSC) 323 of system 300, and the MMSC 323 may deliver the MMS message to recipient device 302. As a result, instead of receiving the original SMS message sent by sender device 301, the recipient device 302 may receive and/or present a MMS message having embedded therein an advertisement.

Optionally, the user of sender device 301 may not be charged, or may be charged a reduce fee, for sending the SMS/MMS/IM/Email message which is modified by system 300. Additionally or alternatively, optionally, the user of user of recipient device 302 may not be charged, or may be charged a reduce fee, for receiving the SMS/MMS/IM/Email message which is modified by system 300.

Figure 4:
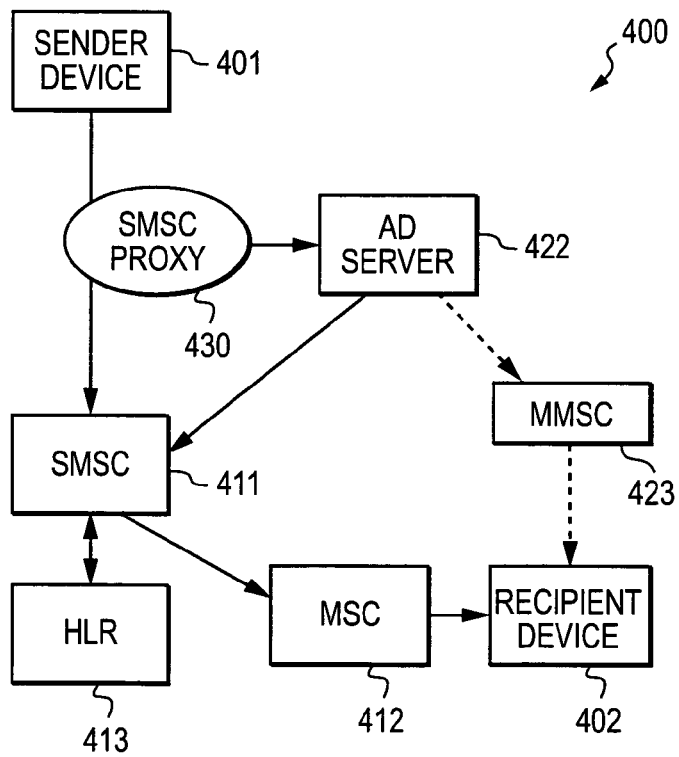
FIG. 4 is a schematic block diagram illustration of a mobile-originated single-network wireless communication system able to deliver content in accordance with another embodiment of the invention.

FIG. 4 schematically illustrates a block diagram of mobile-originated single-network wireless system 400 able to deliver content in accordance with another embodiment of the invention. System 400 may include one or more wireless communication devices or stations, for example, a first wireless communication device which may be referred to as a sender device 401, and a second wireless communication device which may be referred to as a recipient device 402. Optionally, a user of sender device 401 and a user of recipient device 402 may be subscribers of a single wireless communication network of system 400, e.g., a network operated by a single wireless communication operator.

The user of sender device 401 may create, e.g., using sender device 401, a graphical and/or textual SMS message ("SMS message"), intended to be sent from sender device 401 to recipient device 402. The SMS message may be transmitted from sender device 401 to a Short Message Service Center (SMSC) 411 of system 400. An SMSC proxy 430 may "sniff", track or otherwise monitor wireless traffic, and may identify that the SMS message is transmitted from sender device 401 to SMSC 411. Optionally, the SMSC proxy 430 may check, for example, whether sender device 401 is a subscriber that requested that its outgoing SMS messages may be modified, e.g., in exchange for a reduced sending fee or no sending fee; and in one embodiment, SMSC proxy 430 may allow modification of SMS messages transmitted by only such subscribers, or by other pre-defined types or groups of subscribers.

The SMSC proxy 430 may, for example, forward a copy of the SMS message to an ad server 422. The ad server 422 may analyze the SMS message, e.g., to determine whether one or more additional content items, e.g., one or more advertisements, may be added to, inserted to, concatenated to, appended to and/or embedded within the SMS message. The determination may be based on, for example, one or more properties of the user of sender device 401, one or more properties of sender device 401, one or more properties of the user of recipient device 402, one or more properties of recipient device 402, and/or other data, e.g., current time, current date, advertisement quotas, demographic data, the original size of the SMS message, a maximum size limit for a modified SMS message, the space available within the SMS message for inclusion of advertisement(s). These parameters may be further used, for example, to selectively choose one or more advertisements, which may be personally tailored to the user of sender device 401 and/or to the user of recipient device 402.

In one embodiment, based on the analysis, the ad server 422 may selectively modify the SMS message, e.g., by adding to it or inserting into it one or more advertisements which may be stored in ad server 422; and may optionally convert the SMS message to another type of message, e.g., a MMS message. The modified message may be transmitted by the ad server 422, e.g., to the SMSC 411. In another embodiment, the ad server 422 need not modify the original SMS message, and may send the additional content item (e.g., a selected advertisement) to the SMSC 411; the SMSC 411 may insert the additional content item received from ad server 422, to the original SMS message received from sender device 401.

In some embodiments, the SMSC 411 may utilize a Home Location Register (HLR) 413 to determine (e.g., using interrogation) whether recipient device 402 is active, and/or to determine the roaming location of recipient device 402; and may deliver the modified SMS/MMS message to recipient device 402, e.g., optionally utilizing a Mobile Switching Center (MSC) 412.

In some embodiments, optionally, ad server 422 may selectively modify the SMS message, e.g., by converting it to a MMS message and adding to the converted MMS message one or more advertisements stored in ad server 422. The MMS message may be transmitted by the ad server 422 to a MMS Center (MMSC) 423 of system 400, and the MMSC 423 may deliver the MMS message to recipient device 402. As a result, instead of receiving the original SMS message sent by sender device 401, the recipient device 402 may receive and/or present a MMS message having embedded therein an advertisement.

Optionally, the user of sender device 401 may not be charged, or may be charged a reduce fee, for sending the SMS/MMS/IM/Email message which is modified by system 400. Additionally or alternatively, optionally, the user of user of recipient device 402 may not be charged, or may be charged a reduce fee, for receiving the SMS/MMS/IM/Email message which is modified by system 400.

Figure 5:
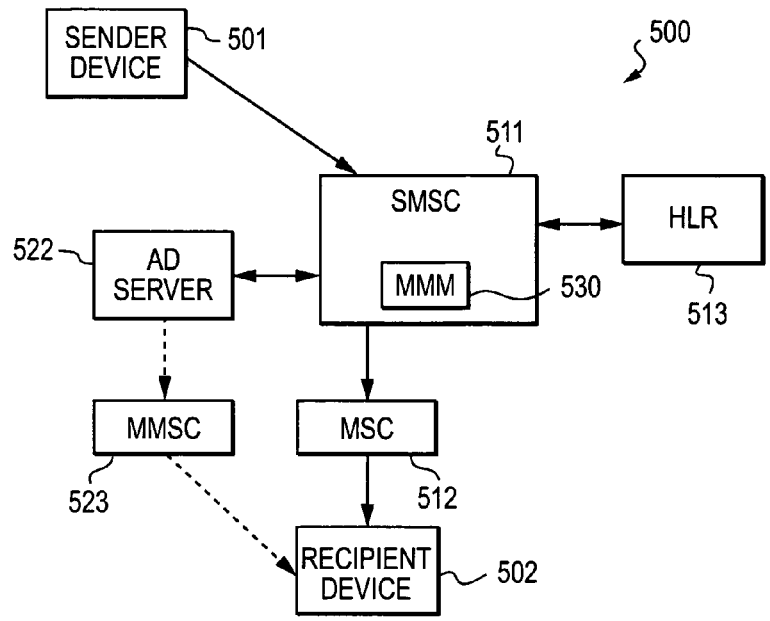
FIG. 5 is a schematic block diagram illustration of a mobile-originated single-network wireless communication system able to deliver content in accordance with yet another embodiment of the invention.

FIG. 5 schematically illustrates a block diagram of mobile-originated single-network wireless system 500 able to deliver content in accordance with yet another embodiment of the invention. System 500 may include one or more wireless communication devices or stations, for example, a first wireless communication device which may be referred to as a sender device 501, and a second wireless communication device which may be referred to as a recipient device 502. Optionally, a user of sender device 501 and a user of recipient device 502 may be subscribers of a single wireless communication network of system 500, e.g., a network operated by a single wireless communication operator.

The user of sender device 501 may create, e.g., using sender device 401, a graphical and/or textual SMS message ("SMS message"), intended to be sent from sender device 501 to recipient device 502. The SMS message may be transmitted from sender device 501 to a Short Message Service Center (SMSC) 511. A Message Modifier Module (MMM) 530 may be included in SMSC 511, or may be otherwise operatively associated with SMSC 511, e.g., as a plug-in, an external interface, or the like. Optionally, the MMM 530 may check, for example, whether sender device 501 is a subscriber that requested that its outgoing SMS messages may be modified, e.g., in exchange for a reduced sending fee or no sending fee; and in one embodiment, the MMM 530 may allow modification of SMS messages transmitted by only such subscribers, or by other pre-defined types or groups of subscribers.

The MMM 530 and/or the SMSC 511 may be operatively associated with an ad server 522, and may analyze the SMS message, e.g., to determine whether one or more additional content items, e.g., one or more advertisements, may be added to, inserted to, concatenated to, appended to and/or embedded within the SMS message. The determination may be based on, for example, one or more properties of the user of sender device 501, one or more properties of sender device 501, one or more properties of the user of recipient device 502, one or more properties of recipient device 502, and/or other data, e.g., current time, current date, advertisement quotas, demographic data, the original size of the SMS message, a maximum size limit for a modified SMS message, the space available within the SMS message for inclusion of advertisement(s). These parameters may be further used, for example, to selectively choose one or more advertisements, which may be personally tailored to the user of sender device 501 and/or to the user of recipient device 502.

Based on the analysis, the ad server 522 may select an appropriate advertisement or other content item. The ad server 522 and/or the MMM 530 may insert the selected advertisement or other content item to the SMS message, and may optionally convert the SMS message to another type of message, e.g., a MMS message. The modified message may be delivered to the recipient device, for example, through a MMS Center (MMSC) 523 (e.g., if the original SMS message is converted to a MMS message), or through the SMSC 511. The SMSC 511 may utilize a Home Location Register (HLR) 513 to determine (e.g., using interrogation) whether recipient device 502 is active, and/or to determine the roaming location of recipient device 502; and may deliver the modified message to recipient device 502, e.g., optionally utilizing a Mobile Switching Center (MSC) 512.

In some embodiments, optionally, ad server 522 may selectively modify the SMS message; may optionally convert it to another type of message, e.g., a MMS message; and may add to the converted MMS message one or more advertisements stored in ad server 522. The MMS message may be transmitted by the ad server 522 to MMS Center (MMSC) 523 of system 500, and the MMSC 523 may deliver the MMS message to recipient device 502. As a result, instead of receiving the original SMS message sent by sender device 501, the recipient device 502 may receive and/or present a MMS message having embedded therein an advertisement.

Optionally, the user of sender device 501 may not be charged, or may be charged a reduce fee, for sending the SMS/MMS/IM/Email message which is modified by system 500. Additionally or alternatively, optionally, the user of user of recipient device 502 may not be charged, or may be charged a reduce fee, for receiving the SMS/MMS/IM/Email message which is modified by system 500.

Figure 6:
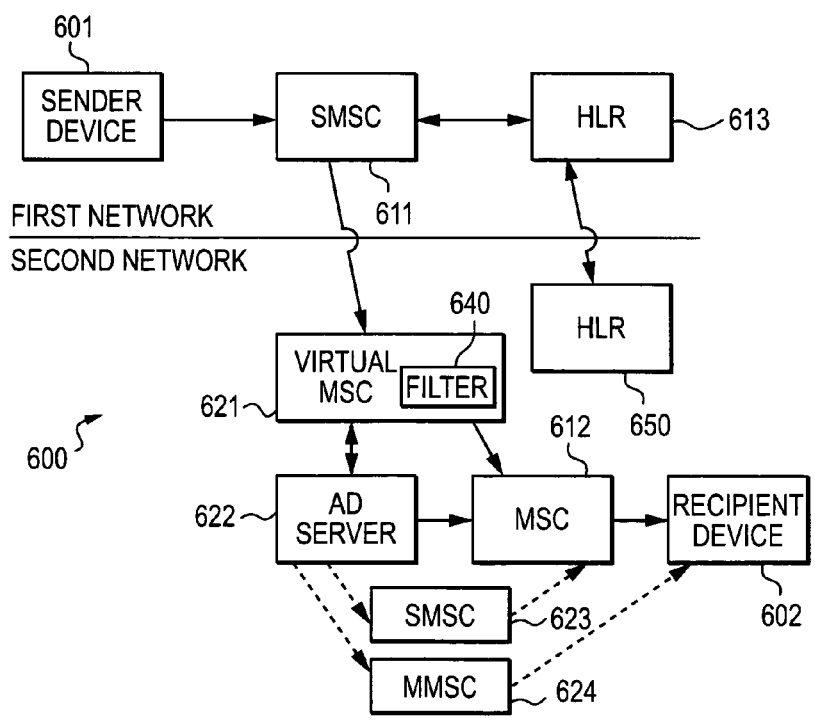
FIG. 6 is a schematic block diagram illustration of a mobile-terminated multiple-network wireless communication system able to deliver content in accordance with an embodiment of the invention.

FIG. 6 schematically illustrates a block diagram of mobile-terminated multiple-network wireless system 600 able to deliver content in accordance with an embodiment of the invention. System 600 may include one or more wireless communication devices or stations, for example, a first wireless communication device which may be referred to as a sender device 601, and a second wireless communication device which may be referred to as a recipient device 602. Optionally, a user of sender device 601 may be a subscriber of a first wireless communication network, e.g., a network operated by a first wireless communication operator; whereas a user of recipient device 602 may be a subscriber of a second wireless communication network, e.g., a network operated by a second wireless communication operator.

The user of sender device 601 may create, e.g., using sender device 601, a graphical and/or textual SMS message ("SMS message"), intended to be sent from sender device 601 to recipient device 602. The SMS message may be transmitted by sender device 601 to a Short Message Service Center (SMSC) 611 of the first network. The SMSC 611 may query or interrogate a Home Location Register (HLR) 613 to determine (e.g., using interrogation) whether recipient device 602 is active, and/or to determine the roaming location of recipient device 602. The HLR 613 of the first network, may in turn query or interrogate a foreign HLR 650 of the second network, and may obtain a MSC routing. Optionally, the foreign HLR 650 of the second network may indicate, to HLR 613 of the first network, the location or address of a virtual MSC 621 of the second network; this may be performed, for example, only with regard to subscribers that requested to have their SMS messages modified. Optionally, the foreign HLR 650 of the second network may provide to the HLR 611 of the first network, an indication whether the user of recipient device requested or allowed modification of SMS messages.

The SMSC 611 of the first network may transmit the SMS message to the virtual MSC 621 of the second network, which may be operatively connected to an ad server 622. The virtual MSC 621 and/or the ad server 622 may analyze the SMS message, e.g., to selectively determine whether one or more additional content items, e.g., one or more advertisements, may be added to, inserted to, concatenated to, appended to and/or embedded within the SMS message. The determination may be based on, for example, one or more properties of the user of sender device 601, one or more properties of sender device 601, one or more properties of the user of recipient device 602, one or more properties of recipient device 602, and/or other data, e.g., current time, current date, advertisement quotas, demographic data, the original size of the SMS message, a maximum size limit for a modified SMS message, the space available within the SMS message for inclusion of advertisement(s). These parameters may be further used, for example, to selectively choose one or more advertisements, which may be personally tailored to the user of sender device 601 and/or to the user of recipient device 602.

Based on the analysis, the virtual MSC 621 and/or the ad server 622 may selectively modify the SMS message, e.g., by adding to it or inserting into it one or more advertisements which may be stored in ad server 622; and may optionally convert the SMS message to another type of message, e.g., a MMS message. The modified message may be transmitted, by the virtual MSC 621 or the ad server 622, to a MSC 612 of the second network or to a SMS Center (SMSC) 623, which may transmit the modified message to recipient device 602; or may be transmitted to another server, e.g., a MMS Center (MMSC) 624 which may transmit the modified message to recipient device 602.

Optionally, the user of sender device 601 may not be charged, or may be charged a reduce fee, for sending the SMS/MMS/IM/Email message which is modified by system 600. Additionally or alternatively, optionally, the user of user of recipient device 602 may not be charged, or may be charged a reduce fee, for receiving the SMS/MMS/IM/Email message which is modified by system 600.

In some embodiments, the foreign HLR 650 of the second network may not provide, to the HLR 611 of the first network, an indication whether the user of recipient device 602 requested SMS/MMS modifications. In such case, the virtual MSC 621 may optionally include a front-end filter 640, to determine whether the user of recipient device 602 requested SMS/MMS modifications. If the determination result is positive, then the virtual MSC 621 and/or the ad server 622 may modify the SMS/MMS message, and the modified message may be transmitted, by the virtual MSC 621 or the ad server 622, to a MSC 612 of the second network or to a SMS Center (SMSC) 623, which may transmit the modified message to recipient device 602; or may be transmitted to a MMS Center (MMSC) 624 which may transmit the modified message to recipient device 602. Alternatively, if the determination result is negative, then the virtual MSC 621 may forward the original SMS/MMS message, substantially unmodified, to the MSC 612 for delivery to recipient device 602.

In some embodiments, optionally, ad server 622 may selectively modify the SMS message; may optionally convert it to another type of message, e.g., a MMS message; and may add to the converted MMS message one or more advertisements stored in ad server 622. The MMS message may be transmitted by the ad server 622 to MMS Center (MMSC) 623 of system 600, and the MMSC 623 may deliver the MMS message to recipient device 602. As a result, instead of receiving the original SMS message sent by sender device 601, the recipient device 602 may receive and/or present a MMS message having embedded therein an advertisement.

In some embodiments, the system may handle MMS messages, for example, utilizing a request-response mechanism. For example, a MMS service center may send, e.g., to a virtual MMS service center or a message modifier, a request to add an advertisement, optionally sending the original MMS message. The virtual MMS service center or message modifier may receive the request and the original MMS message, may process them, may insert the advertisement and optionally re-package the message, and send it back to the MMS service center for delivery to the recipient device. This may allow, for example, a virtual MMS service center or a message modifier to operate in the route of the MMS message.

In some embodiments, SMS/MMS/IM/Email modifications may take into account, for example, a list or criteria indicating users, devices and/or operators which may be pre-approved or allowed to utilize the SMS/MMS/IM/Email modification service ("white-list"), and/or a list or criteria indicating users, devices and/or operators which may be disapproved or disallowed to utilize the SMS/MMS/IM/Email modification service ("black-list"). Optionally, access to the modification service may be granted only to "white-list" users, devices and/or operators, or may be disallowed to "black-list" users, devices and/or operators.

Some embodiments may include, for example, contextual advertising in mobile phones, in SMS/MMS/IM/Email, e.g., with respect to textual content and/or non-textual (e.g., graphical) content.

Some embodiments may utilize a taxonomy, for example, a pre-defined classification into categories, e.g., in a tree structure having "branches", or other hierarchical structure. For example, a branch may be "games", having sub-branches of "sports" and "arcade"; and the "sports" sub-branch may have sub-sub-branches of "basketball", "football" and "tennis". In some embodiments, an advertisement presented to a user, or inserted into a SMS/MMS/IM/Email message, may be selected based on taxonomy-based analysis. For example, if a user played a football game on his mobile phone, and further played a basketball game on his mobile phone, the system may present to this user, or insert into SMS/MMS/IM/Email messages that this user sends and/or receives, advertisements or content items which may be sports-related.

In some embodiments, text analysis of textual messages may be utilized to selectively target advertisements to a user of a mobile device. For example, if a user of a mobile device sends or receives a textual message having certain keywords (e.g., "football", "football tickets", "football agency", or the like), then the system may modify the textual message, e.g., by selectively inserting or adding an advertisement related to that keyword (e.g., an advertisement for a football match, an advertisement for football tickets, or the like). In some embodiments, for example, an advertiser may associate advertisements or advertising campaigns with certain keywords, or to keywords that belong to a certain group or category.

In some embodiments, the system may map SMS/MMS/IM/Email context text to keywords. For example, a user may create and send a textual message "How about we see The Last Samurai tonight?". Based on textual analysis, and/or identification of the phrase "The Last Samurai", the system may map the textual message to a "movies" category, and/or to an "action movies" sub-category, thereby selecting advertisement that are related to this category or sub-category. Additionally or alternatively, based on identification of the word "tonight", the advertisement selection process may be further fined-tuned, e.g., to select an advertisement for an action movie which is expected to play tonight (e.g., in the night-time of the current date), optionally in the geographical region in which the user is currently located and/or in the geographical region in which the user resides (e.g., based on subscriber's personal information). For example, the user may be presented with the message, or the original message may be modified to include the message, "See this movie tonight at 19:30 at the Paragon Theater in Times Square". Optionally, the embedded message may include a reward or an incentive for the user, e.g., to act on the presented message, for example, by adding the message "Get free popcorn".

In some embodiments, the system may perform multi-level parsing, for example, lexical, semantic, contextual, or the like. The lexical parsing may, for example, divide the content for words and phrases, e.g., using a stemming algorithm. The discrete words or phrases may be assigned weights, e.g., according to semantic and/or contextual parameters. For example, the phrase "How about we see The Last Samurai tonight?" may be associated with a semantic identifier of "action movie" and a time-related identifier of "tonight", since the phrase "The Last Samurai" may be included in the taxonomy tree under the "movies/action movies" category. The system may further find "Samurai" in a "Japan/fashion" category", yet the contextual analysis may assign a higher weight value to the "action movie" category.

In some embodiments, the contextual analysis may take into account a user's age and/or demographic data. For example, if the user sends a textual message "Let's bet on tonight's match", the system may check the user's age (e.g., over 21 years old) before approving to add a gambling-related advertisement to the original message.

In some embodiments, a negative keywords process may be performed, for example, to avoid presentation of advertisement when the system determines that the presentation might be inappropriate. For example, if the user sends a message having a negative context, e.g., "my uncle has just died" or "I want a divorce", the system may determine to avoid presenting any advertisements or a type of advertisements.

In some embodiments, the system may utilize image processing and/or image recognition algorithms to correlate a SMS/MMS/IM/Email message with one or more keywords, and may then use the keywords to select a matching advertisement to accompany the SMS/MMS/IM/Email message. This may include, for example, processing and/or image recognition of one or more files (e.g., image files or video files) which may be attached to or embedded within an original SMS/MMS/IM/Email message.

In some embodiments, a user of a mobile phone may send a MMS message which may be pre-prepared by the mobile phone operator or provider. For example, the user may select and send a pre-prepared "happy birthday" MMS message, a pre-prepared "happy anniversary" MMS message, or the like. The system may be configured such that a pre-prepared MMS message is pre-correlated with one or more keywords, and the system may utilize these keywords for advertisement selection. For example, if the user sends a pre-prepared "happy anniversary" MMS message, the system may add an advertisement related to celebrations, restaurants or flower shops.

In some embodiments, the system may select an advertisement based on the identity of the sender, based on the identity of the recipient, and/or based on a possible relation between the sender and the recipient. For example, if the sender sends a message to his mother, e.g., the message starting with the words "Hi mom", or addressed to "mom" in his phone book, then the message may be modified such that the mother may receive an advertisement of "gifts for your children" (e.g., an advertisement for a gift shop or a toys store). Other suitable algorithms may be used to select an advertisement based on the identity of the user and/or the recipient, the relationship between them, or other parameters.

In some embodiments, the system may determine to insert an advertisement to a message, or to refrain from inserting an advertisement to a message (e.g., to maintain the original message unmodified), based on an analysis taking into account whether one or more users is a subscriber of certain services. In one embodiment, for example, advertisements may be added to messages sent by devices owned by subscribers of a certain operator. In another embodiment, for example, advertisements may be not be added to messages sent by devices owned by subscribers of a certain operator, or messages sent by devices owned by subscribers of a certain operator may be maintained and delivered unmodified. In another embodiment, for example, advertisements may be added to messages sent by devices owned by subscribers having a certain subscription status, e.g., "low rate" or non-expensive payment plan. In another embodiment, advertisements may not be added to messages sent by devices owned by subscribers having a certain subscription status, e.g., "premium" subscribers, "gold" subscribers, users that are subscribed to a minimum number of services, or the like. In another embodiment, for example, advertisements may be added to messages sent by devices owned by subscribers having a low subscription cost, e.g., paying a monthly price lower than a certain threshold. In another embodiment, for example, advertisements may not be added to messages sent by devices owned by subscribers having a high subscription cost, e.g., paying a monthly price higher than a certain threshold. In another embodiment, for example, advertisements may be added to messages sent by devices owned by subscribers that opted-in (e.g., actively selected) to have their messages modified, or subscribers that did not opt-out from having their messages modified. In another embodiment, for example, advertisements may not be added to messages sent by devices owned by subscribers that did not opt-in (e.g., did not actively select) to have their messages modified, or subscribers that actively opted-out from having their messages modified. Other suitable criteria or conditions may be used to determine whether or not to modify a message by adding or inserting to the message an advertisement or other content.

In some embodiments, the system may determine to insert an advertisement to a message, or to refrain from inserting an advertisement to a SMS/MMS/IM/Email message (e.g., to maintain the original message unmodified), based on an analysis taking into account one or more properties of the SMS/MMS/IM/Email message, e.g., a length or size of the original message, a length or size of the original message, a length or size available for insertion of advertisement, or the like. For example, in one embodiments, a SMS message may have a maximum length of approximately 160 characters; the system may determine that a first original SMS message, e.g., having a length of approximately 100 characters, is suitable for modification and for insertion of an advertisement, since it allows to insert an advertisement having a length of approximately 60 characters; whereas the system may determine that a second original SMS message, e.g., having a length of approximately 155 characters, is unsuitable for modification and for insertion of an advertisement, since it allows to insert an advertisement having a length of approximately 5 characters. For example, the system may determine to insert an advertisement to the original message, if the size of the original message is smaller than a certain threshold value, or if the size available for advertisement placement is greater than a certain threshold value.

Figure 7:
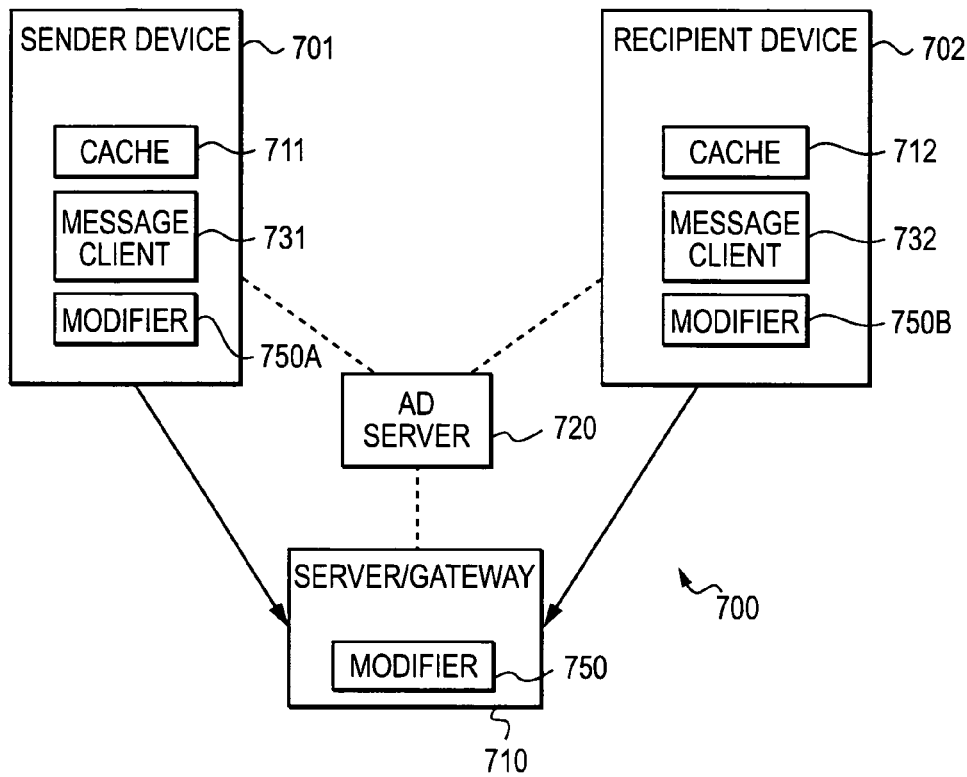
FIG. 7 is a schematic block diagram illustration of a wireless communication system of wireless context delivery in accordance with an embodiment of the invention.

FIG. 7 schematically illustrates a block diagram of a wireless communication system 700 of wireless context delivery in accordance with an embodiment of the invention. System 700 may include one or more wireless communication devices or stations, for example, a first wireless communication device which may be referred to as a sender device 701, and a second wireless communication device which may be referred to as a recipient device 702.

The user of sender device 701 may create, e.g., using sender device 701, a message. The message may include or may be, for example, a textual message, a graphical message, a SMS message, a MMS message, an Instant Messaging (IM) item, an Electronic Mail (Email) message, or the like. The SMS/MMS/IM/Email message may be intended to be sent from sender device 701 to recipient device 702, e.g., through a wireless communication server/gateway 710.

In some embodiments, server/gateway 710 may receive the message from sender device 701, and may modify the message by adding or inserting to the message an additional content item, e.g., an advertisement. This may be performed, for example, by a first server/gateway 710 that may handle an incoming communication from sender device 701, and/or by a second server/gateway 710 that may handle an outgoing communication towards recipient device 702. The additional content item may be selected, for example, utilizing an ad server 720, e.g., which may utilize an ad selection process similar to the operations described above. The modified message may be delivered by server/gateway 710 to recipient device 702, which may view the modified message, including the additional content item embedded therein.

In other embodiments, sender device 701 may modify the message created by its user, prior to sending the message to server/gateway 710. For example, sender device 701 may modify the message by adding or inserting to the message an additional content item, e.g., an advertisement. In one embodiment, the additional content item may be selected, for example, utilizing ad server 720, e.g., which may utilize an ad selection process similar to the operations described above; for example, sender device 701 may query (e.g., online) the ad server 720, may receive from ad server 720 a selected advertisement, and may insert or add the selected advertisement to the message, prior to sending the message to server/gateway 710. In another embodiment, sender device 701 may add or insert to the message a content item or advertisement selected or taken from a local (e.g., offline) cache 711 within sender device 701, e.g., storing one or more content items or advertisements. Sender device 701 may then send the modified message, instead of the original message created by the user, to server/gateway 710, which may deliver the modified message to the recipient device 702.

In yet other embodiments, sender device 701 may send the original message (e.g., created by the user of sender device 701), substantially unmodified, to server/gateway 710; the server/gateway 710 may deliver the original message, substantially unmodified, to recipient device 702; and recipient device 702 may receive the original message and may modify it prior to presenting the message to the user of recipient device 702. For example, recipient device 702 may modify the message by adding or inserting to the message an additional content item, e.g., an advertisement. In one embodiment, the additional content item may be selected, for example, utilizing ad server 720, e.g., which may utilize an ad selection process similar to the operations described above; for example, recipient device 702 may query (e.g., online) the ad server 720, may receive from ad server 720 a selected advertisement, and may insert or add the selected advertisement to the message, prior to presenting the message to the user of recipient device 702. In another embodiment, recipient device 702 may add or insert to the message a content item or advertisement selected or taken from a local (e.g., offline) cache 712 within recipient device 702, e.g., storing one or more content items or advertisements. Recipient device 702 may then present the modified message to the user of recipient device 702, instead of presenting the original message created by the user of sender device 701.

In some embodiments, local cache 711 of sender device 701, and/or local cache 712 of recipient device 702, may include one or more content items, e.g., advertisements. The content items may be, for example, pre-programmed, pre-installed, pre-fetched or pre-downloaded, e.g., from ad server 720.

In some embodiments, for example, a content item (e.g., an advertisement) may be selected to be added to an original message based on contextual analysis of the original message, based on a contextual analysis of a previous (e.g., non-current) message, based on a contextual analysis of a chain of messages (e.g., a chain of messages including the current message, a chain of messages excluding the current message, or the like), based on a contextual analysis of one or more previous message which were sent and/or received by sender device 701, based on a contextual analysis of one or more previous message which were sent and/or received by recipient device 702, based on one or more properties or characteristics of the user of sender device 701, based on one or more properties or characteristics of the user of recipient device 702, based on an analysis of prior behavior of the user of sender device 701, based on an analysis of prior behavior of the user of recipient device 702, based on one or more properties or characteristics of sender device 701, based on one or more properties or characteristics of recipient device 702, based on an analysis of prior operations of sender device 701, based on an analysis of prior operations of recipient device 702, based on off-line analysis or selection, based on online analysis or selection, a combination of some or all of these criteria, based on user indications regarding the type(s) or properties of advertisements or subjects in which the user is interested, and/or based on other suitable criteria. In one embodiment, the selection process may be non-contextual and/or non-targeted, for example, a "run-of-network"-type advertisement (e.g., a general advertisement, a non-targeted advertisement or campaign, a pseudo-random or random advertisement, or the like), may be added to the original message.

In some embodiments, a contextual analysis of the original message, and/or an analysis of user's properties and/or behavior, may be utilized to select the additional content item(s) or advertisement(s). In some embodiments, advertisements may be selected and/or added "on the fly", online, dynamically, utilizing interception, on the sender side, on the recipient side, on the server/gateway side, or may be fetched offline, using local cache 711 or 721, in the background, or the like.

In some embodiments, sender device 701 may include a message client 731, and/or recipient device 702 may include a message client 732. The message clients 731 and/or 732 may include, for example, a hardware component and/or software component, able to send and/or receive a message, a textual message, a graphical message, a SMS message, a MMS message, an IM item, an Electronic Mail (Email) message, or the like. For example, the message clients 731 and/or 732 may be implemented as a SMS/MMS/IM/Email application, able to send messages, receive messages, compose or edit outgoing messages intended for transmission, present or view or playback incoming messaged, delete previous messages, or the like. In some embodiments, message client 731 (732) may be able to fetch or obtain one or more content items or advertisements, e.g., using an online query utilizing ad server 720, and/or utilizing an offline operation utilizing local cache 711 (712).

In some embodiments, for example, message client 731 (732) may be installed in device 701 (702), and may operate as a substitute to other pre-installed message client applications, e.g., substituting an application pre-provided or pre-programmed by the manufacturer or seller of device 701 (702). In other embodiments, message client 731 (732) may be a wrapper application, a plug-in, an add-on, an envelope, or a front-end to a pre-programmed or pre-provided client application of device 701 (702). In other embodiments, message client 731 may a part of a pre-provided application of device 701 (702), e.g., implemented as a module or SDK which may be compiled into the pre-provided application. Other suitable ways may be used to incorporate message client 731 (732) into device 701 (702).

In one embodiment, an advertisement or content item may be added to a current (e.g., most recent) message, based on a contextual analysis of the last (e.g., non-current) message, or based on a contextual analysis of one or more previous (e.g., non-current) messages. For example, recipient device 702 may receive four consecutive messages; recipient device 702 and/or server/gateway 710 may add to the fourth (e.g., last) message a content item (e.g., an advertisement) based on a contextual analysis of the third message, or of the first three messages. Other suitable analysis schemes may be used.

In some embodiments, the selection and/or the insertion of the content item (e.g., the advertisement) to a SMS/MMS/IM/Email message may be performed by a modifier 750, which may be a hardware component and/or a software component. In one demonstrative embodiment, as shown in FIG. 7, the modifier 750 may be included in the server/gateway 710, and may modify the message after the message is transmitted by sender device 701 and before the message is received by recipient device 702. In another embodiment, modifier 750 may optionally be included in sender device 701, shown as a modifier 750A, and may modify the message before the message is transmitted by sender device 701, e.g., once the user of sender device finishes to compose or edit the message and commands the sender device 701 to transmit the message. In yet another embodiment, modifier 750 may optionally be included in recipient device 702, shown as a modifier 750B, and may modify the message after the message is received by recipient device 702 and before the message is presented (e.g., to a user) on the recipient device 702. In some embodiments, modifiers 750, 750A and/or 750B may obtain the advertisement from a local (e.g., offline) cache (for example, local cache 711 or 712), and/or from a remote (e.g., online) ad server (for example, ad server 720).

In some embodiments, the modification of the message from an original message to a modified message may optionally include, for example, conversion or augmentation of the message from a first type to a second type. For example, in one embodiment, the original message may be a textual message, and the modified message may be a graphical message or a message having a textual component and a graphical component. In another embodiment, for example, the original message may be a SMS message, and the modified message may be a MMS message. Other suitable conversions may be used.

Figure 8:
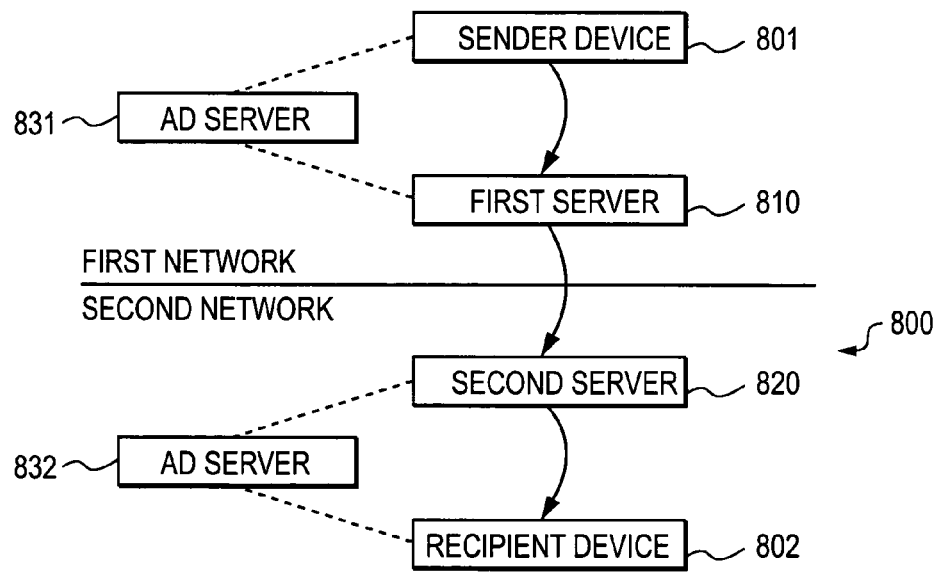
FIG. 8 is a schematic block diagram illustration of a wireless communication system able to deliver content in accordance with another embodiment of the invention.

FIG. 8 schematically illustrates a block diagram of a wireless system 800 able to deliver content in accordance with an embodiment of the invention. System 800 may include one or more wireless communication devices or stations, for example, a first wireless communication device which may be referred to as a sender device 801, and a second wireless communication device which may be referred to as a recipient device 802. Optionally, a user of sender device 801 and a user of recipient device 802 may be subscribers of a one or more wireless communication networks of system 800, e.g., operated by one or more wireless communication operators. In some embodiments, for example, system 800 may include two or more wireless networks.

The user of sender device 801 may create, e.g., using sender device 801, a graphical and/or textual message, for example, a MMS message and/or an Instant Messaging (IM) message and/or an Electronic Mail (Email) message (which may be referred to herein as "original message"), intended to be sent from sender device 801 to recipient device 802.

The communication route from sender device 801 to recipient device 802 may include one or more servers or intermediary gateways, spanning one or more wireless networks. For example, the original message may be sent by sender device 801 to a first server 810, which may forward the original message to a second server 820, which may deliver the original message to recipient device 802. For example, first server 810 and/or second server 820 may include a MMS Center (MMSC), an IM server, an Email server, or the like.

In accordance with some embodiments of the invention, the original message may be modified prior to its presentation on recipient device 802, e.g., by insertion of contextual and/or non-contextual advertisement or other content. The modification may be performed, for example, by sender device 801, by the first server 810, by the second server 820, and/or by recipient device 802; and may optionally utilize one or more ad servers to select and/or insert the ad or content, e.g., an ad server 831 of the first network, and/or an ad server 832 of the second network.

For example, in some embodiments, sender device 801 and/or first server 810 may be operatively associated with ad server 831 of the first network. The ad server 831 may selectively provide an advertisement, or other content, intended for insertion to the original message, e.g., based on contextual analysis and/or non-contextual analysis of the original message, based on one or more properties or characteristics of sender device 801, based on one or more properties or characteristics of the user of sender device 801, based on one or more properties or characteristics of recipient device 802, based on one or more properties or characteristics of the user of recipient device 802, based on other data (e.g., date, time, etc.), or the like. The modified message may then be transferred from first server 810 to second server 820, which may deliver the modified message to recipient device 802. The recipient device 802 may present the modified message, e.g., including the inserted advertisement or other content.

In other embodiments, for example, sender device 801 and first server 810 may not modify the original message created by the user of sender device 801. For example, recipient device 802 and/or second server 820 may be operatively associated with ad server 832 of the second network. The ad server 832 may selectively provide an advertisement, or other content, intended for insertion to the original message, e.g., based on contextual analysis and/or non-contextual analysis of the original message, based on one or more properties or characteristics of sender device 801, based on one or more properties or characteristics of the user of sender device 801, based on one or more properties or characteristics of recipient device 802, based on one or more properties or characteristics of the user of recipient device 802, based on other data (e.g., date, time, etc.), or the like. For example, the second server 820 may modify the original message and deliver the modified message to recipient device 802; or the recipient device 802 may receive the original message substantially unmodified and modify the original message prior to its presentation. Then, recipient device 802 may present the modified message, e.g., including the inserted advertisement or other content.

Figure 9:
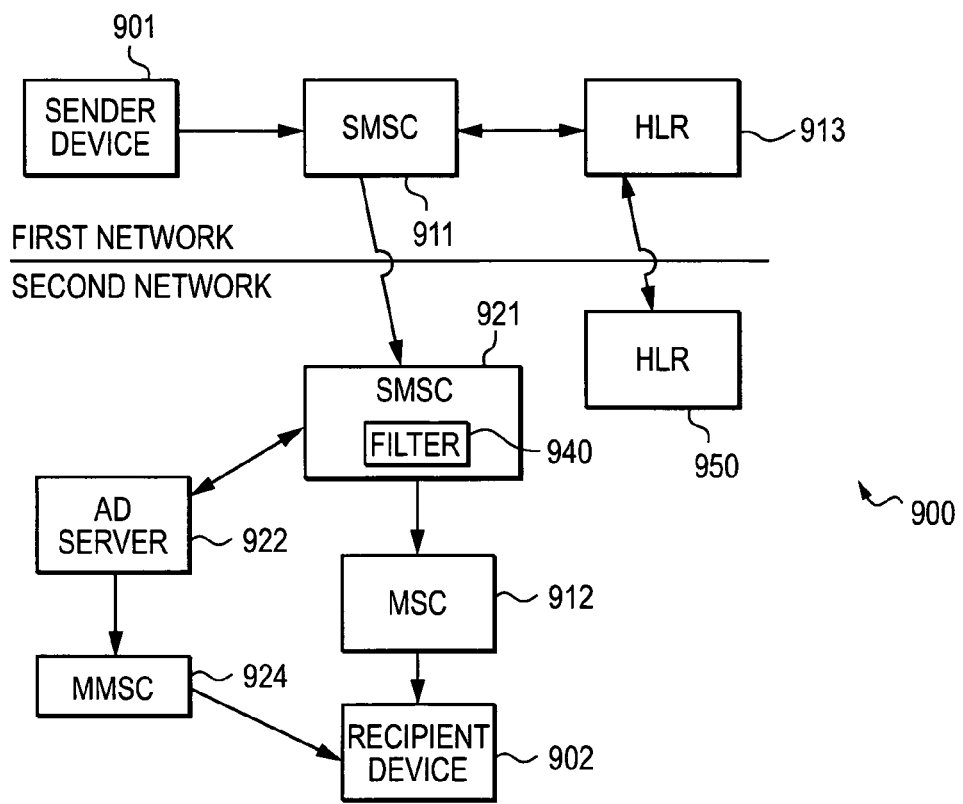
FIG. 9 is a schematic block diagram illustration of a mobile-terminated multiple-network wireless system able to deliver content in accordance with another embodiment of the invention.

FIG. 9 schematically illustrates a block diagram of a mobile-terminated multiple-network wireless system 900 able to deliver content in accordance with an embodiment of the invention. System 900 may include one or more wireless communication devices or stations, for example, a first wireless communication device which may be referred to as a sender device 901, and a second wireless communication device which may be referred to as a recipient device 902. Optionally, a user of sender device 901 may be a subscriber of a first wireless communication network, e.g., a network operated by a first wireless communication operator; whereas a user of recipient device 902 may be a subscriber of a second wireless communication network, e.g., a network operated by a second wireless communication operator.

The user of sender device 901 may create, e.g., using sender device 901, a graphical and/or textual SMS message ("SMS message"), intended to be sent from sender device 901 to recipient device 902. The SMS message may be transmitted by sender device 901 to a Short Message Service Center (SMSC) 911 of the first network. The SMSC 911 may query or interrogate a Home Location Register (HLR) 913 of the first network, to determine whether recipient device 902 is active, and/or to determine the roaming location of recipient device 902.

The HLR 913 of the first network may in turn query a foreign HLR 950 (e.g., of the second network), and may obtain a SMSC routing. Optionally, the foreign HLR 950 of the second network may indicate, to HLR 913 of the first network, the location or address of a SMSC 921 of the second network; this may be performed, for example, only with regard to subscribers that requested to have their SMS/MMS messages modified. Optionally, the foreign HLR 950 of the second network may provide to the HLR 911 of the first network, an indication whether the user of recipient device requested or allowed modification of SMS/MMS messages.

The SMSC 911 of the first network may transmit the SMS message to the SMSC 921 of the second network, which may be operatively connected to an ad server 922. The SMSC 921 and/or the ad server 922 may analyze the SMS message, e.g., to selectively determine whether one or more additional content items, e.g., one or more advertisements, may be added to, inserted to, concatenated to, appended to and/or embedded within the SMS message. The determination may be based on, for example, one or more properties of the user of sender device 901, one or more properties of sender device 901, one or more properties of the user of recipient device 902, one or more properties of recipient device 902, and/or other data, e.g., current time, current date, advertisement quotas, demographic data, the original size of the SMS/MMS/IM/Email message, a maximum size limit for a modified SMS/MMS/IM/Email message, the space available within the SMS/MMS/IM/Email message for inclusion of advertisement(s). These parameters may be further used, for example, to selectively choose one or more advertisements, which may be personally tailored to the user of sender device 901 and/or to the user of recipient device 902.

Based on the analysis, the SMSC 921 and/or the ad server 922 may selectively modify the original message, e.g., by adding to it or inserting into it one or more advertisements which may be stored in ad server 922; and may optionally convert the SMS message to another type of message, e.g., a MMS message. The modified message may be transmitted, by the SMSC 921 or the ad server 922, to a Mobile Switching Center (MSC) 912, or to another type of server such as a MMS Center (MMSC) 924, which may deliver the modified SMS/MMS message to recipient device 902.

Optionally, the user of sender device 901 may not be charged, or may be charged a reduce fee, for sending the SMS/MMS/IM/Email message which is modified by system 900. Additionally or alternatively, optionally, the user of user of recipient device 902 may not be charged, or may be charged a reduce fee, for receiving the SMS/MMS/IM/Email message which is modified by system 900.

In some embodiments, the foreign HLR 950 of the second network may not provide, to the HLR 911 of the first network, an indication whether the user of recipient device 902 requested or approved SMS/MMS modifications. In such case, the SMSC 921 may optionally include a front-end filter 940, to determine whether the user of recipient device 902 requested SMS/MMS modifications. If the determination result is positive, then the SMSC 921 and/or the ad server 922 may modify the SMS/MMS message, and may send the modified message to the MSC 912 or the MMSC 924 for delivery to recipient device 902. Alternatively, if the determination result is negative, then the SMSC 921 may forward the original SMS message, substantially unmodified, to the MSC 912 for delivery to recipient device 902.

In some embodiments, the modification of the message from an original message to a modified message may optionally include, for example, conversion or augmentation of the message from a first type to a second type. For example, in one embodiment, the original message may be a textual message, and the modified message may be a graphical message or a message having a textual component and a graphical component. In another embodiment, for example, the original message may be a SMS message, and the modified message may be a MMS message. Other suitable conversions may be used.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by ad server 110 of FIG. 1, by communicator 150 of FIG. 1, by device 170 of FIG. 1, by control server 120 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 118, memory unit 159, or database 140), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system comprising:
a modifier to receive a message after transmission by a first mobile wireless communication device and addressed to a second mobile wireless communication device, prior to receipt by said second mobile wireless communication device, to selectively insert an advertisement into the message, and to send said message with said inserted advertisement to the second mobile wireless communication device.

2. The system of claim 1, wherein the message comprises a message selected from a group consisting of: a Short Message Service (SMS) message, and a Multimedia Messaging Service (MMS) message.

3. The system of claim 1, wherein the modifier is to select the advertisement based on a contextual analysis of the message.

4. The system of claim 3, wherein the contextual analysis comprises an analysis utilizing a taxonomy tree of classified topics.

5. The system of claim 3, wherein the contextual analysis is to determine to maintain the message unmodified.

6. The system of claim 1, wherein the modifier is to select the advertisement based on a contextual analysis of one or more messages communicated prior to said message.

7. The system of claim 1, wherein the modifier is to select the advertisement based on a manufacturer of the second wireless communication device and a model of the second mobile wireless communication device.

8. The system of claim 1, wherein the modifier is to select the advertisement based on a location of the second mobile wireless communication device.

9. The system of claim 1, wherein the modifier is to select the advertisement based on a personal data item representing a property of a user of the second mobile wireless communication device.

10. The system of claim 9, wherein the personal data item is selected from a group consisting of: a data item representing an age of said user, a data item representing an age group of said user, a data item representing a gender of said user, a data item representing an occupation of said user, a data item representing a profession of said user, and a data item representing usage pattern associated with said user.

11. The system of claim 1, comprising a proxy server to intercept the message transmitted by the first mobile wireless communication device, and to route the message to a gateway incorporating said modifier.

12. The system of claim 1, wherein the modifier is included in said first mobile wireless communication device, and wherein the modifier is to selectively add the advertisement prior to transmission of the message to the second mobile wireless communication device.

13. The system of claim 1, wherein the modifier is included in said second mobile wireless communication device.

14. The system of claim 13, wherein the modifier is included in a message client application of said second mobile wireless communication device.

15. The system of claim 1, wherein the modifier is to obtain the advertisement from a local cache operatively coupled to the modifier.

16. The system of claim 1, wherein the modifier is included in a device selected from a group consisting of: the first mobile wireless communication device, and the second mobile wireless communication device; and wherein the modifier is to obtain the advertisement from a local cache of said device while said device is offline.

17. The system of claim 1, wherein the modifier is to obtain the advertisement through an online connection with an advertisement server.

18. A method comprising:
receiving a message after transmission by a first mobile wireless communication device and addressed to a second mobile wireless communication device; and
prior to receipt by said second mobile wireless communication device, selectively inserting an advertisement into the message; and
sending said message with said inserted advertisement to the second mobile wireless communication device.

19. The method of claim 18, wherein receiving the message comprises:

receiving a message selected from a group consisting of: a Short Message Service (SMS) message, and a Multimedia Messaging Service (MMS) message.

20. The method of claim 18, further comprising:
selecting the advertisement based on a contextual analysis of the message.

21. The method of claim 18, further comprising:
based on a contextual analysis of the message, determining to maintain the message unmodified.

22. The method of claim 18, further comprising:
intercepting the message transmitted by the first mobile wireless communication device.

23. A mobile wireless communication device comprising:
a receiver to receive a message transmitted by another mobile wireless communication device and addressed to said mobile wireless communication device; and
a modifier to selectively insert an advertisement into the message prior to its presentation on said mobile wireless communication device, wherein the modifier is to select the advertisement from a local cache when said mobile wireless communication device is offline.

24. The wireless communication device of claim 23, wherein the message comprises a message selected from a group consisting of: a Short Message Service (SMS) message, and a Multimedia Messaging Service (MMS) message.

25. The wireless communication device of claim 23, wherein the modifier is to select the advertisement based on a contextual analysis of the message.

26. The wireless communication device of claim 23, wherein the modifier is to select the advertisement based on a contextual analysis of at least one message communicated prior to said message.

* * * * *